United States Patent [19]

Harms et al.

[11] 4,255,325
[45] Mar. 10, 1981

[54] REACTIVE DYESTUFFS

[75] Inventors: Wolfgang Harms; Klaus Wunderlich, both of Leverkusen; Klaus van Oertzen, Cologne, all of Fed. Rep. of Germany

[73] Assignee: Bayer Aktiengesellschaft, Leverkusen, Fed. Rep. of Germany

[21] Appl. No.: 960,706

[22] Filed: Nov. 14, 1978

[30] Foreign Application Priority Data

Nov. 16, 1977 [DE] Fed. Rep. of Germany ....... 2751137

[51] Int. Cl.³ .................... C09B 45/00; C09B 29/22; C09B 29/36
[52] U.S. Cl. .................. 260/146 T; 260/153; 260/147; 260/242.2; 544/181; 544/187; 544/188; 544/189
[58] Field of Search ............. 260/153, 146 T; 544/181, 187, 188, 189

[56] References Cited

U.S. PATENT DOCUMENTS

| | | | |
|---|---|---|---|
| 3,394,122 | 7/1968 | Seitz et al. | 260/153 |
| 4,049,661 | 9/1977 | Seiler et al. | 260/153 |
| 4,115,378 | 9/1978 | Bien et al. | 260/153 |

*Primary Examiner*—John F. Niebling
*Attorney, Agent, or Firm*—Sprung, Felfe, Horn, Lynch & Kramer

[57] ABSTRACT

Reactive dyestuffs of the formula $$D-(T)_m$$

wherein
D = the radical of an organic dyestuff,
m = 1–4 and
T =

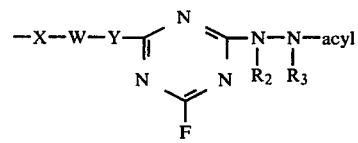

wherein
X and Y = a direct bond or a bridge member,
W =

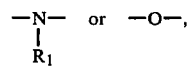

acyl = an acyl radical and
$R_1$–$R_3$ = H, alkyl or aralkyl, the radical T being bonded, via X, to a C atom of an aromatic-carbocyclic or aromatic-heterocyclic ring of the chromophore and their use for dyeing and printing textile materials containing hydroxyl groups and textile materials containing nitrogen. The dyeings obtained are distinguished by good fastness properties, in particular excellent fastness to wet processing.

16 Claims, No Drawings

REACTIVE DYESTUFFS

The present invention relates to reactive dyestuffs of the formula $$D-(T)_m \qquad (I)$$

wherein
D = the radical of an organic dyestuff,
m = 1-4 and
T =

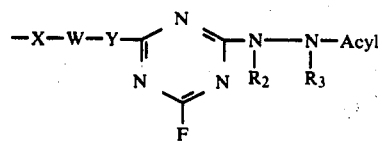  (II)

wherein
X and Y = a direct bond or a bridge member,
W =

or —O—,
acyl = an acyl radical and
$R_1$-$R_3$ = H, alkyl or aralkyl,
the radical T being bonded, via X to a C atom of an aromatic-carbocyclic or aromatic-heterocyclic ring of the chromophore.

Particularly suitable radicals D are those of monoazo or polyazo dyestuffs (metal-containing and metal-free), azoporphin dyestuffs (metal-containing and metal-free), metal-containing formazan dyestuffs, anthraquinone dyestuffs, nitro dyestuffs, azomethine dyestuffs, oxazine dyestuffs, dioxazine dyestuffs, phenazine dyestuffs, triphenylmethane dyestuffs and benzanthrone dyestuffs.

D preferably represents the radical of a water-soluble azo dyestuff, anthraquninone dyestuff, phthalocyanine dyestuff or formazan dyestuff, in particular of such a dyestuff containing sulphonic acid groups.

W preferably represents —NH—.

Examples of suitable bridge members X and Y are: —CO—, —SO$_2$—, —CO-arylene-, —CO-alkylene-, —CO-aralkylene-, —CO-alkarylene-, —SO$_2$-arylene-, —SO$_2$-alkylene-, —SO$_2$-aralkylene-, —SO$_2$-alkarylene-, -alkylene-, -aralkylene-, -alkarylene-, -arylene-,

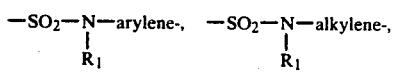

and

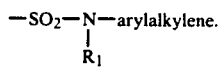

X and Y preferably represent a direct bond.
Acyl preferably denotes: —CO—R$_4$, —SO$_2$R$_4$—,

and

in which
R$_4$ = alkyl, aryl, aralkyl, —O-alkyl, —O-aryl or NH$_2$ which is optionally monosubstituted or disubstituted, and/or by alkyl or aryl.
R$_1$-R$_3$ represent, in particular, H and C$_1$-C$_4$-alkyl.
Particularly preferred acyl radicals are —CO-R$_4'$ and —SO$_2$R$_4'$, in which
R$_4'$ = —NH$_2$, —NH-alkyl, —NH-aryl, alkyl or aryl.
Alkyl here preferably represents C$_1$-C$_4$-alkyl and aryl preferably represents phenyl.

Dyestuffs in which the radical

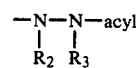  (III)

represents —NH—NH—CO—R$_5$ (IV), in which R$_5$ = —NH$_2$ or —C$_6$H$_5$,
are particularly preferred.

Preferred dyestuffs are furthermore the following:

1. Azo dyestuffs of the formula

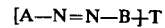  (V)

wherein
A represents the radical of a heterocyclic or carbocyclic diazo component, preferably from the benzene, naphthalene or triazole series, and
B represents the radical of a heterocyclic, carbocyclic or CH-acid coupling component, in particular the radical of an optionally further substituted phenol, naphthol, aniline, naphthylamine, 5-aminopyrazole, 5-pyrazolone, pyridone, aminopyridine, acetoacetic acid arylide, indole or pyrimidine. In this formula, the radical T is linked to a ring C atom of the diazo components or coupling components.

Particularly valuable dyestuffs of these series are those which contain water-soluble groups, such as sulphonic acid groups or carboxyl groups. The azo dyestuffs can be metal-free or can be in the form of metal complexes, copper complexes, chromium complexes and cobalt complexes being preferred.

The groups which form metal complexes, preferably hydroxyl, carboxyl and amino groups, are in the ortho-position relative to the azo group.

The diazo components A and the coupling components B can be substituted, for example by the following substituents: sulpho, nitro, halogen, such as fluorine, chlorine and bromine, C$_1$-C$_4$-alkyl which is optionally substituted by chlorine, C$_1$-C$_4$-alkoxy, hydroxyl or cyano, C$_1$-C$_4$-alkoxy which is optionally substituted by C$_1$-C$_4$-alkoxy, hydroxyl or cyano, C$_1$-C$_4$-alkylmercapto, C$_1$-C$_4$-alkylsulphonyl, phenyl or naphthyl which are optionally substituted by sulpho, amino, C$_1$-C$_4$-alkyl, C$_1$-C$_4$-alkoxy, nitro or halogen, trifluoromethyl, amino, hydroxyl, C$_1$-C$_4$-alkylcarbonylamino, C$_1$-C$_4$-alkylsulphonylamino, benzoylamino or benzenesulphonylamino which are optionally substituted by sulpho, $C_1$–$C_4$-alkyl, $C_1$–$C_4$-alkoxy, nitro or halogen, phenyl-$C_1$–$C_4$-alkyl which is optionally substituted in the phenyl nucleus by sulpho, $C_1$–$C_4$-alkyl, $C_1$–$C_4$-alkoxy, nitro or halogen, phenylazo or naphthylazo which are optionally substituted in the phenyl nucleus or naphthalene nucleus respectively by hydroxyl, amino, sulpho, $C_1$–$C_4$-alkyl, $C_1$–$C_4$-alkoxy, nitro or halogen, $C_1$–$C_4$-alkylcarbonyloxy, benzoyloxy which is optionally substituted by $C_1$–$C_4$-alkyl, $C_1$–$C_4$-alkoxy, nitro or halogen, aminocarbonyl, mono- or di-$C_1$–$C_4$-alkylamino, ureido, carboxyl, cyano, carboxamide or sulphonamide which are optionally substituted on the nitrogen by $C_1$–$C_4$-alkyl, phenyl or benzyl, it being possible for alkyl to be further substituted by sulpho or sulphato and for phenyl and benzyl to be further substituted by sulpho, $C_1$–$C_4$-alkyl, $C_1$–$C_4$-alkoxy, halogen or nitro, $C_1$–$C_4$-alkylsulphonylaminosulphonyl or phenylsulphonylaminosulphonyl which is optionally substituted in the phenyl nucleus by methyl, methoxy, chlorine or nitro.

Preferred azo dyestuffs (V) correspond to the formula

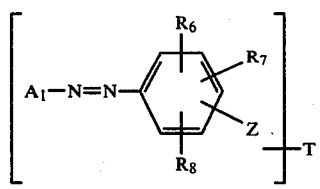

(VI)

wherein $A_1$ denotes a phenyl or naphthyl radical which can be substituted by sulpho, carboxyl, nitro, chlorine, $C_1$–$C_4$-alkyl, $C_1$–$C_4$-alkoxy, phenyl or naphthyl which are optionally substituted by sulpho, amino or $C_1$–$C_4$-alkyl, amino, acetylamino, benzyl which is optionally substituted by amino, sulpho or $C_1$–$C_4$-alkyl, phenylazo or naphthylazo which are optionally substituted by amino, $C_1$–$C_4$-alkyl, sulpho, $C_1$–$C_4$-alkoxy or hydroxyl, or trifluoromethyl, Z denotes H, hydroxyl, alkoxy which is optionally substituted by hydroxyl or $C_1$–$C_4$-alkoxy or amino which is optionally substituted by $C_1$–$C_4$-alkyl, phenyl or benzyl, it being possible for alkyl to be further substituted by cyano, hydroxyl or $C_1$–$C_4$-alkoxy and for phenyl and benzyl to be further substituted by methyl, methoxy, chlorine, nitro or sulpho, and $R_6$, $R_7$ and $R_8$ independently of one another denote hydrogen, $C_1$–$C_4$-alkyl, $C_1$–$C_4$-alkoxy, amino, $C_1$–$C_4$-alkylcarbonylamino, phenyl which is optionally substituted by $C_1$–$C_4$-alkyl, amino, hydroxyl or sulpho. Azo dyestuffs which are also preferred correspond to the formula

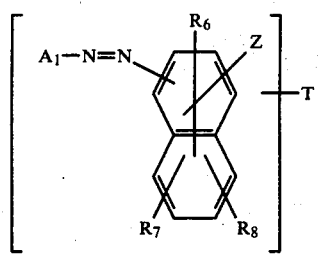

(VII)

wherein

T, $A_1$, $R_6$, $R_7$, $R_8$ and z have the abovementioned meaning.

Azo dyestuffs which are furthermore preferred correspond to the formula

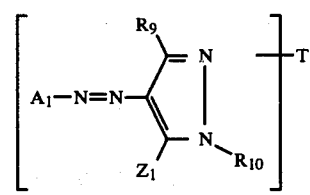

(VIII)

wherein

T and $A_1$ have the abovementioned meaning, $Z_1$ denotes amino or hydroxyl, $R_9$ denotes $C_1$–$C_4$-alkyl, preferably methyl, or carboxyl and $R_{10}$ denotes phenyl or naphthyl which are optionally substituted by chlorine, $C_1$–$C_4$-alkyl, sulpho, $C_1$–$C_4$-alkoxy or amino.

A further preferred group of azo compounds corresponds to the formula

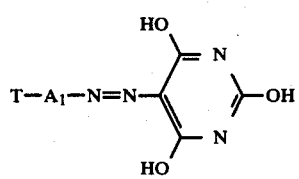

(IX)

wherein

T and $A_1$ have the abovementioned meaning.

Dyestuffs of the formula

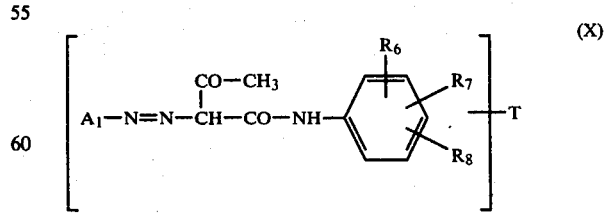

(X)

wherein

T, $A_1$, $R_6$, $R_7$ and $R_8$ have the abovementioned meaning, are likewise particularly valuable.

Azo dyestuffs of the formula

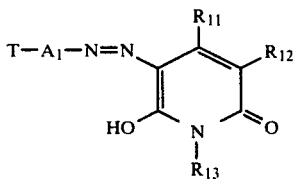

wherein $R_{11}$ denotes $C_1$–$C_4$-alkyl, aryl, carboxyl or hydroxyl, $R_{12}$ denotes cyano, carboxyl, sulpho, sulpho-$C_1$–$C_4$-alkyl or aminocarbonyl, $R_{13}$ denotes hydrogen, $C_1$–$C_4$-alkyl, aryl or aralkyl and T and $A_1$ have the abovementioned meaning, and of the formula

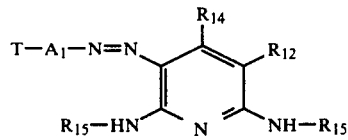

wherein

T, $R_{12}$ and $A_1$ have the abovementioned meaning, $R_{14}$ denotes $C_1$–$C_4$-alkyl or amino and $R_{15}$ denotes hydrogen or $C_1$–$C_4$-alkyl, are likewise preferred.

Preferred dyestuffs within the formulae (VI) to (XII) are those in which $A_1$ represents the radical of an amine of the formula

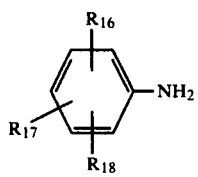

wherein $R_{16}$ denotes hydrogen, sulpho, hydroxyl, carboxyl or amino, $R_{17}$ denotes hydrogen, chlorine, nitro, aminosulphonyl, $C_1$–$C_4$-alkyl, $C_1$–$C_4$-alkoxy, amino, sulpho, hydroxyl or phenylazo or naphthylazo which are optionally substituted in the phenyl nucleus or naphthyl nucleus by hydroxyl, sulpho or amino and $R_{18}$ denotes hydrogen, chlorine, nitro, $C_1$–$C_4$-alkyl or $C_1$–$C_4$-alkoxy, and to the formulae

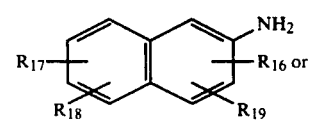

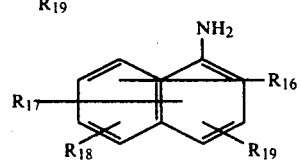

wherein $R_{16}$, $R_{17}$ and $R_{18}$ have the abovementioned meanings and $R_{19}$ denotes hydrogen, chlorine, nitro, aminosulphonyl, $C_1$–$C_4$-alkyl, $C_1$–$C_4$-alkoxy, amino, sulpho, hydroxyl or phenylazo or naphthylazo which are optionally substituted in the phenyl nucleus or naphthyl nucleus by hydroxyl, sulpho or amino.

2. Anthraquinone dyestuffs of the formula

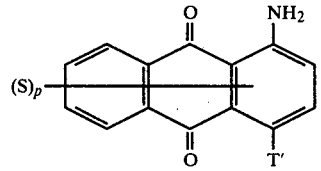

in which

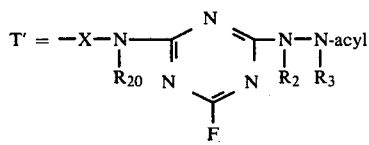

and

X = a direct bond or a bridge member, in particular —NH-arylene-$(CH_2)_{0-1}$— or —NH-alkylene-, wherein S denotes hydrogen or a substituent, $R_{20}$ denotes hydrogen, alkyl or aralkyl, p denotes an integer from 1 to 6, arylene denotes optionally substituted phenylene and alkylene denotes an aliphatic radical with 2–12 C atoms which is optionally interrupted by heteroatoms.

Preferably, S represents hydrogen, halogen, in particular chlorine, amino, hydroxyl or, very particularly preferably, sulpho, arylene represents a phenylene radical which is optionally substituted by sulpho, carboxyl, $C_1$–$C_4$-alkyl or $C_1$–$C_4$-alkoxy and alkylene represents $C_2$–$C_4$-alkylene or cyclohexylene.

$R_{20}$ for hydrogen, $C_1$–$C_4$-alkyl or benzyl and p for 1 or 2.

Examples which may be mentioned of starting compounds for the preparation of the dyestuffs (XVI) are: 1-amino-4-(3'-aminophenylamino)-anthraquinone-2,4'-disulphonic acid, 1-amino-4-(4'-aminophenylamino)-anthraquinone-2,3'-disulphonic acid, 1-amino-4-(4'-methyl-amino-phenylamino)-anthraquinone-2,3'-disulphonic acid, 1-amino-4-(4'-aminophenylamino)-anthraquinone-2,6-disulphonic acid and the corresponding -2,7-, -2,5- and -2,8-disulphonic acids. 1-amino-4-(3'-aminophenylamino)-anthraquinone-2,5-, -2,6-, -2,7- or -2,8-disulphonic acid; 1-amino-4-(3'-aminophenylamino)-anthraquinone-2,4',5-trisulphonic acid and the corresponding -2,4',6-, -2,4',7- and -2,4',8-trisulphonic acids. 1-amino-4-(4'-aminophenylamino)-anthraquinone-2,3',5-trisulphonic acid and the corresponding -2,3',8-trisulphonic acid, 1-amino-4-(4'-aminophenylamino)-anthraquinone-2,2'-disulphonic acid, 1-amino-4-(4'-methylamino-phenylamino)-anthraquinone-2,2'-disulphonic acid, 1-amino-4-(5'-amino-2'-methyl-phenylamino)-anthraquinone-2,4'-disulphonic acid, 1-amino-4'-(5'-amino-4'-methylphenylamino)-anthraquinone-2,2'-disulphonic acid, 1-amino-4-(3'-amino-2'-methylphenylamino)-anthraquinone-2,5'-disulphonic acid, 1-amino-4-(5'-amino-2',6'-dimethylphenylamino)-anthraquinone-2,3'- and -2,4'-disulphonic acid, 1-amino-4-(5'-amino-2',4',6'-trimethylphenylamino)-anthraquinone-2,3′-disulphonic acid, 1-amino-4-(5′-aminomethyl-2′,6′-dimethyl-phenylamino)-anthraquinone-2,3′-disulphonic acid, 1-amino-4-(5′-methylaminomethyl-2′,6′-dimethyl-phenylamino)-anthraquinone-2,3′-disulphonic acid, 1-amino-4-(4′-methylaminomethyl-phenylamino)-anthraquinone-2,2′-disulphonic acid, 1-amino-4-(4′-amino-3′-carboxy-phenylamino)-anthraquinone-2,6-disulphonic acid, 1-amino-4-(5′-amino-2′-methoxy-phenylamino)-anthraquinone-2,4′-disulphonic acid, 1-amino-4-[4′-(4′′-aminophenyl)-phenylamino]-anthraquinone-2,2′′,3′-trisulphonic acid, 1-amino-4-(2′,6′-dimethyl-3′-sulphonamido)-anthraquinone-2-sulphonic acid and 1-amino-4-(4′-amino-2′-carboxy-phenylamino)-anthraquinone-2,6- and -2,7-disulphonic acid.

3. Azaporphin dyestuffs

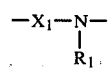  (XVII)

in particular copper phthalocyanines and nickel phthalocyanines in which
the radical —X—W—Y— represents

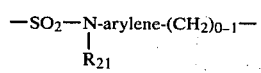

and is bonded to the benzene rings of the phthalocyanine nucleus,
wherein,
$X_1$ represents —$SO_2$—,

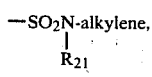

or

—$SO_2$N-alkylene,
|
$R_{21}$ wherein
$R_{21}$=H, $C_1$–$C_4$-alkyl or aralkyl, in particular benzyl,
arylene=a divalent aromatic radical, in particular phenylene, which is optionally substituted, for example by sulpho, $C_1$–$C_4$-alkyl, $C_1$–$C_4$-alkoxy or halogen and
alkylene=a divalent aliphatic radical which is optionally interrupted by hetero-atoms, it also being possible for the phthalocyanine nucleus to contain 1–3 further substituents, in particular sulpho groups and/or sulphonamide groups, and the total number of substituents—including the reactive substituents—being at most 4.

4. Formazan dyestuffs of the formula

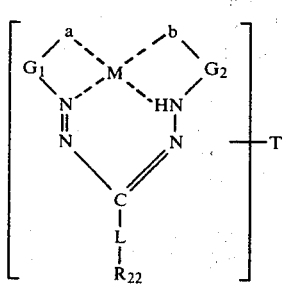  (XVIII)

wherein
M denotes a heavy metal atom, preferably a copper atom,
$G_1$ and $G_2$ denote aromatic-carbocyclic or aromatic-heterocyclic rings which carry the substituents a and b in the o-position relative to the formazan nitrogen atoms,
a and b denote hydrogen, hydroxyl, carboxyl or aminosulphonyl,
L denotes a direct bond or a bridge member and $R_{22}$ denotes alkyl or aryl,
and the aromatic-carbocyclic or aromatic-heterocyclic rings $G_1$ and $G_2$ can contain further substituents, such as $C_1$–$C_4$-alkyl, $C_1$–$C_4$-alkoxy, chlorine, bromine, amino or, preferably, sulpho.

Preferred suitable aromatic-carbocyclic and aromatic-heterocyclic rings $G_1$ and $G_2$ are benzene rings and naphthalene rings.

Examples of suitable bridge members $W_1$ are —CONH—, —CO— or —$SO_2$.

Suitable alkyl $R_{22}$ is $C_1$–$C_4$-alkyl which is optionally substituted by $C_1$–$C_4$-alkoxy.

Suitable aryl $R_{22}$ is phenyl or naphthyl which are optionally substituted by $C_1$–$C_4$-alkyl, $C_1$–$C_4$-alkoxy, chlorine, bromine, sulpho, amino or phenylazo, it being possible for the phenylazo groups to be further substituted by $C_1$–$C_4$-alkyl, $C_1$–$C_4$-alkoxy, nitro, chlorine, sulpho or amino.

The dyestuffs according to the invention are obtained by a process in which dyestuffs or dyestuff precursors which contain at least one amino group, amide group or hydroxyl group with at least one reactive hydrogen atom are subjected to a condensation reaction with cyanuric fluoride and a hydrazide of the formula

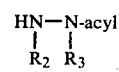  (XIX)

wherein
$R_2$, $R_3$ and acyl have the meaning given under formula (I), in any desired sequence.

A variant of the preparation consists in first subjecting the dyestuffs or dyestuff precursors to a condensation reaction with cyanuric fluoride and with hydrazines to give compounds of the formula

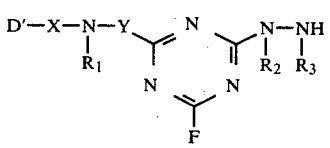  (XX)

wherein
D′ is D or the radical of a dyestuff precursor and
X, Y, $R_1$, $R_2$ and $R_3$ have the meaning indicated above,
and then subjecting these compounds of the formula (XX) to a condensation reaction with acyl halides of the formula acyl-Hal  (XXI)

wherein
acyl has the meaning indicated under formula I and Hal is fluorine, chlorine or bromine, but preferably chlorine, and, in the case of the dyestuff precursors, converting these into the end dyestuffs in the customary manner, for example by a condensation reaction or coupling reaction.

Depending on the nature of the starting materials used, this process is carried out in an aqueous, aqueous-organic or organic medium at temperatures from −10° to +40°, preferably 0° to +20°, in the presence of alkaline condensing agents, such as alkali metal bicarbonate solutions, alkali metal carbonate solutions, alkali metal hydroxide solutions, alkali metal hydrogen phosphate solutions, alkali metal phosphate solutions, trialkylamines or N,N-dialkylanilines.

The dyestuffs obtainable by the processes described above can be subjected to further reactions which are customary for dyestuffs, for example treating metallisable dyestuffs with metal-donating agents, in particular with chromium salts, cobalt salts, copper salts or nickel salts. Dyestuffs which contain reducible groups, in particular nitro groups, can be reduced and dyestuffs which contain acylatable groups, in particular acylatable amino groups, can be acylated.

Preferably, dyestuffs containing amide groups or amino groups, of the formula

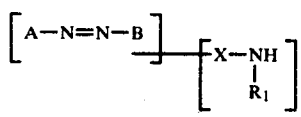 (XXII)

wherein
A, B, X and $R_1$ have the meaning given,

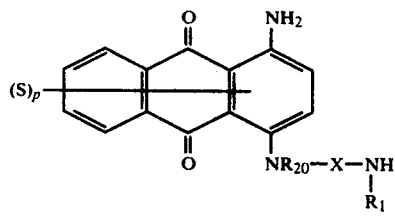 (XXIII)

wherein
S, $R_{20}$, X, $R_1$ and p have the meaning given,

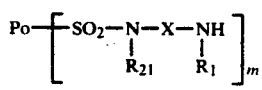 (XXIV)

wherein
Pc, $R_{21}$, X, $R_1$ and m have the meaning given and

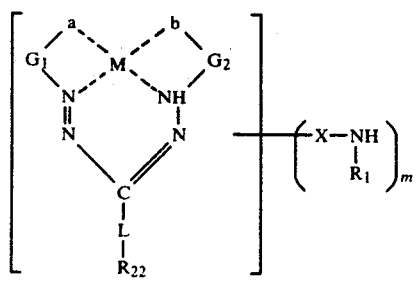 (XXV)

wherein
$G_1$, $G_2$, a, b, X, $R_{22}$, L and $R_1$ have the meaning given and m denotes 1 or 2, are reacted with 2,4,6-trifluorotriazine and with a hydrazide, by the process described above.

The new dyestuffs are valuable products which are suitable for the most diverse application purposes. As water-soluble compounds, they are of preferred interest for dyeing and printing textile materials containing hydroxyl groups and textile materials containing nitrogen, in particular textile materials made of natural cellulose and regenerated cellulose, and furthermore of wool, silk and synthetic polyamide fibres and polyurethane fibres.

The products are particularly suitable as reactive dyestuffs for dyeing cellulose materials by the techniques known for this.

For dyeing cellulose, the dyestuffs are preferably employed in an aqueous solution, to which substances having an alkaline reaction, such as alkali metal hydroxide or alkali metal carbonate, or compounds which are converted into substances, having an alkaline reaction, such as alkali metal bicarbonate, can be added. It is possible to add to the solution further auxiliaries, which, however, should not react with the dyestuffs in an undesired manner. Examples of such additives are surface-active substances, such as alkyl-sulphates, or substances which prevent migration of the dyestuff, or dyeing auxiliaries, such as urea (to improve the solubility and the fixing of the dyestuffs), or inert thickeners, such as oil-in-water emulsions, tragacanth, starch, alginate or methylcellulose.

The solutions or pastes thus prepared are applied, for example by padding on a padder (short liquor) or by printing, onto the material to be dyed and the material is then heated to elevated temperature, preferably 40° to 150° C., for some time. The heating can take place in a hot flue, in a steaming apparatus, on heated rollers or by introducing the material into heated concentrated salt baths, and the heating processes can be carried out either by themselves or successively in any desired sequence. If a padding liquor or dyeing liquor without an alkali is used, the dry goods are subsequently passed through a solution having an alkaline reaction, to which sodium chloride or sodium sulphate decahydrate is added. The addition of a salt in this procedure reduces the migration of the dyestuff from the fibre.

The material to be dyed can also be pretreated with one of the abovementioned acid-binding agents and then treated with the solution or paste of the dyestuff, and finally the dyestuff can be fixed, as indicated, at elevated temperature.

For dyeing from a long liquor, the material is introduced into an aqueous solution of the dyestuff (liquor ratio 1:5 to 1:40) at room temperature and dyeing is carried out for 40 to 90 minutes, the temperature being appropriately increased up to 85° C., and a salt, for example sodium sulphate, and then an alkali, for example sodium phosphates, sodium carbonate or alkalis, being added in portions. During this procedure, the chemical reaction between the dyestuff and fibre begins. After the chemical fixing has ended, the dyed material is rinsed hot and finally soaped, non-fixed residues of the dyestuff being removed. Dyeings which are outstandingly fast, in particular fast to wet processing and light, are obtained.

In the so-called pad-cold batch process, subsequent heating of the padded fabric can be spared by keeping the fabric at room temperature for some time, for example 20 to 40 hours. In this process, a stronger alkali is employed than in the case of the dyeing process described above from a long liquor.

For printing materials containing hydroxyl groups, a printing paste consisting of the dyestuff solution, a thickener, such as sodium alginate, and a compound which has an alkaline reaction or which splits off an alkali on heating, such as sodium carbonate, sodium phosphate, potassium carbonate, potassium acetate or sodium bicarbonate and potassium bicarbonate, is used and the printed material is rinsed and soaped.

If the dyestuffs contain groupings which form metal complexes, the fastness properties of the dyeings and prints can be much improved by after-treatment of the material with metal-donating agents, such as copper salts, for example copper sulphate, or chromium salts, cobalt salts and nickel salts, such as chromium acetate, cobalt sulphate or nickel sulphate.

In general, textile materials containing amide groups, such as wool, silk and synthetic polyamide fibres and polyurethane fibres, are dyed in the acid to neutral range by dyeing methods which are customary for these materials, it being advantageous in some cases to finally increase the pH value of the dyebath, for example to pH 6.5 to pH 8.5.

The dyestuffs are applied, for example, to synthetic polyamide fabric in the form of solutions, or, preferably, in dispersed form and the fabric is then after-treated, if appropriate together with acid-binding agents, such as sodium carbonate, preferably in relatively small amounts. Particularly favourable results are achieved with those dyestuffs which are water-insoluble or only sparingly soluble in water. These dyestuffs are processed by techniques which are in themselves customary and with the addition of known auxiliaries to give a dyestuff dispersion and are used as such in the dyebath and/or padding bath or in a printing paste. The auxiliaries suitable for this purpose are, inter alia, compounds which prevent migration of the dyestuff on the fibre, such as cellulose ethers and alkali metal chlorides and sulphates, wetting agents, such as condensation products of ethylene oxide and fatty alcohols or phenols, sulphonated fatty alcohols, solvents, such as thiodiglycol, and furthermore thickeners, such as starch, tragacanth, alginate thickener, gum arabic and the like.

The after-treatment of the dyeings, impregnations and prints obtained on the polyamide fibre fabric is preferably carried out at a temperature of 50–110° C. and over a period of 5 to 60 minutes. In this case also, if the dyestuffs used contain groupings which form metal complexes, the fastness properties of the dyeings can in some cases be improved with metal-donating agents, such as copper salts, for example copper sulphate, or chromium salts, cobalt salts and nickel salts, such as chromium acetate, cobalt sulphate or nickel sulphate.

In general, the dyeings obtainable with the new dyestuffs are distinguished by good to very good fastness properties, in particular by excellent fastness to wet processing.

EXAMPLE 1

18.6 g of the disodium salt of 6-amino-1-hydroxy-2-(2'-sulphophenylazo)-naphthalene-3-sulphonic acid are dissolved in 600 ml of water. 4.0 ml of cyanuric fluoride are added dropwise to the solution, cooled to 0°–5°, in the course of 15 minutes and the pH value is kept at 4.5–5.0 with 2 N sodium carbonate solution. After 15 minutes, a solution, adjusted to pH 5, of 5.6 g of semicarbazide hydrochloride in 50 ml of water is added dropwise and the pH value of the reaction mixture is kept at 5.0–5.5. After the dropwise addition, the pH value is kept at 6.0–6.5, and after 2 hours the mixture is warmed to 20°. The dyestuff is slowly salted out at pH 6.0 with 120 g of sodium chloride, filtered off and washed with 15% strength sodium chloride solution. It is dried at 40° C. in vacuo. In order to stabilise the dyestuff, it can be made into a paste, before drying, with a solution of 0.5 g of primary sodium phosphate ($NaH_2PO_4.2H_2O$) and 0.5 g of secondary sodium phosphate (calcined $Na_2HPO_4$) in 20 ml of water.

The resulting dyestuff corresponds to the formula

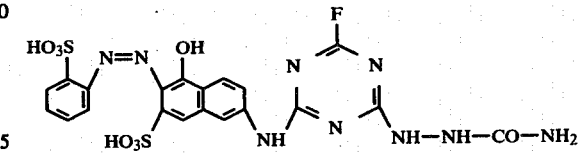

50 g of cotton hanks are dyed in 1 liter of dye liquor containing 1.5 g of the above dyestuff by heating the liquor to 40° in the course of 30 minutes. 50 g of sodium sulphate are added in several portions, 20 g of sodium carbonate are then added and the hanks are treated at this temperature for 60 minutes. After rinsing, soaping at the boil and drying, a dyeing which is very fast to light and wet processing and has a brilliant orange shade is obtained.

If the 2-aminobenzenesulphonic acid, the 6-amino-1-hydroxynaphthalene-3-sulphonic acid and the semicarbazide in Example 1 are replaced by the diazo components, coupling components and hydrazide components indicated in the table which follows, further dyestuffs giving the colour shades indicated are obtained.

| Example No. | Diazo component | Coupling component | Hydrazide component | Colour shade |
|---|---|---|---|---|
| 2 | 2-aminonaphthalene-1,5-disulphonic acid | 6-amino-1-hydroxynaphthalene-3-sulphonic acid | semicarbazide | orange |
| 3 | 2-aminobenzene-1,4-disulphonic acid | 6-amino-1-hydroxynaphthalene-3-sulphonic acid | benzhydrazide | reddish-tinged yellow |
| 4 | 2-amino-5-methoxybenzene-sulphonic acid | 6-amino-1-hydroxynaphthalene-3-sulphonic acid | semicarbazide | scarlet |
| 5 | 2-amino-5-acetylaminobenzene-sulphonic acid | 6-amino-1-hydroxynaphthalene-3-sulphonic acid | " | " |
| 6 | 2-amino-5-methoxybenzene-sulphonic acid | 6-methylamino-1-hydroxynaphthalene-3-sulphonic acid | " | " |
| 7 | 2-amino-4-sulphobenzoic acid | 6-methylamino-1-hydroxynapthalene-3-sulphonic acid | " | orange |
| 8 | 2-amino-5-sulphobenzoic acid | 6-amino-1-hydroxynaphthalene-3- | acethydrazide | " |

-continued

| Example No. | Diazo component | Coupling component | Hydrazide component | Colour shade |
|---|---|---|---|---|
| 9 | 2-aminobenzenesulphonic acid | 6-amino-1-hydroxynaphthalene-3-sulphonic acid | benzenesulphonic acid hydrazide | " |
| 10 | 2-aminobenzenesulphonic acid | 7-amino-1-hydroxynaphthalene-3-sulphonic acid | semicarbazide | " |
| 11 | 7-aminonaphthalene-1,3,6-trisulphonic acid | 6-amino-1-hydroxynaphthalene-3-sulphonic acid | " | " |
| 12 | 7-aminonaphthalene-1,3-disulphonic acid | 6-amino-1-hydroxynaphthalene-3-sulphonic acid | " | " |
| 13 | 2-amino-5-methylbenzene-sulphonic acid | 6-amino-1-hydroxynaphthalene-3-sulphonic acid | " | " |
| 14 | 7-aminonaphthalene-1,3-disulphonic acid | 6-amino-1-hydroxynaphthalene-3-sulphonic acid | benzhydrazide | " |

EXAMPLE 15

18.6 g of the disodium salt of 6-amino-1-hydroxy-2-(2'-sulphophenylazo)-naphthalene-3-sulphonic acid in 600 ml of water are subjected to a condensation reaction with 4.0 ml of cyanuric fluoride in the manner indicated in Example 1. A solution of 6.0 g of benzhydrazide in 120 ml of water is allowed to run into the resulting solution in the course of 5 minutes. Thereafter, the pH value of the reaction mixture is kept at 6.0 and the temperature is allowed to rise from 0°–5° to 20° in the course of 2 hours. After the condensation reaction has ended, the dyestuff of the formula

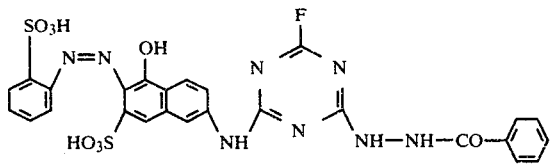

is slowly salted out with 40 g of sodium chloride, filtered off and washed with 10% strength sodium chloride solution. After drying at 40° in vacuo, a product which dyes cotton by the process of Example 1 in orange shades which are fast to light and wet processing is obtained.

EXAMPLE 16

24.0 g of the disodium salt of 1-amino-4-(4'-aminophenylamino)-anthraquinone-2,3'-disulphonic acid are dissolved in 480 ml of water. The solution is cooled to 0°–5° and the pH value is adjusted to 4.5.

4.5 ml of cyanuric fluoride are added dropwise in the course of 10 minutes and the pH value is kept at 4.2–4.6 with 2 N sodium carbonate solution. The mixture is subsequently stirred for about a further 15 minutes until the consumption of sodium carbonate has ceased.

5.8 g of semicarbazide hydrochloride are dissolved, at pH 6.0, in 50 ml of water and the solution is cooled to 0°–5°. The semicarbazide solution is now added in one operation to the solution of the difluorotriazinylanthraquinone component. The pH value of the reaction mixture is kept at 6.0–6.3 by means of 2 N sodium carbonate solution. The reaction has ended after about 30 minutes. The mixture is warmed to 20° and the dyestuff which, in the form of the free acid, corresponds to the formula

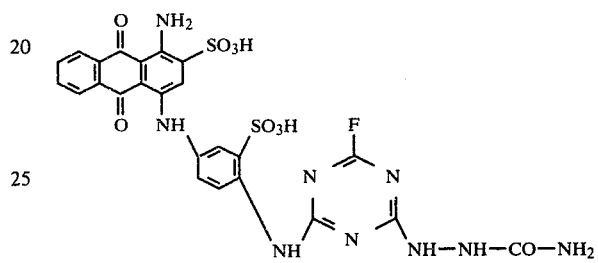

is salted out in the course of one hour by adding 30 g of potassium chloride, filtered off and washed with 500 ml of 5% strength potassium chloride solution.

A greenish-tinged blue dyeing which is very fast to wet processing and light is obtained on cotton by the dyeing process of Example 1.

EXAMPLE 17

28.0 g of 1-amino-4-(5'-amino-2',4',6'-trimethylphenylamino)-anthraquinone-2,3'-disulphonic acid are dissolved, at pH 4.5, in 300 ml of water and the solution is cooled to 0°–5°. 5.2 ml of cyanuric fluoride are added dropwise in the course of 5 minutes and the temperature is further kept at 0°–5° and the pH value is further kept at 4.5 with 2 N sodium carbonate solution. The mixture is subsequently stirred for a further 15 minutes and a solution, adjusted to pH 6.0 and cooled to 0°–5°, of 6.7 g of semicarbazide hydrochloride in 60 ml of water is then added to the solution of the dyestuff component. The pH value is then kept at 6.0–6.3 with 2 N sodium carbonate solution. The condensation reaction of the difluorotriazinyl component with the semicarbazide has ended after 40 minutes. The dyestuff of the formula

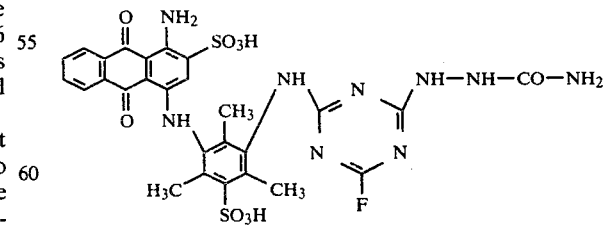

is then salted out at 20° with an amount of potassium chloride such that the concentration of potassium chloride is 20 percent by weight, and the suspension, from which the dyestuff gradually precipitates, is subsequently stirred for a further 3 hours. The dyestuff is now filtered off, washed with 500 ml of 25% strength potassium chloride solution and dried at 40° in vacuo.

It already dyes cotton in strong, reddish-tinged brilliant blue shades, with excellent fastness to light and wet processing, from a long liquor at temperatures above 30° by the dyeing process of Example 1.

EXAMPLE 18

16.0 g of 1-amino-8-hydroxynaphthalene-3,6-disulphonic acid are dissolved, at pH 5.5, in 200 ml of water. After cooling the solution to 0°–5°, 4.6 ml of cyanuric fluoride are added dropwise in the course of 5 minutes and the pH value of the solution is kept at 4.0–4.5 with 20% strength sodium carbonate solution. The solution is subsequently stirred for 10 minutes, 6.0 g of semicarbazide hydrochloride are then added and the pH value is immediately adjusted to 6.0–6.5. This pH value is maintained further, until, after about 1 hour, the condensation reaction has ended.

11.1 g of 2-aminonaphthalene-1-sulphonic acid are dissolved, at pH 7.0, in 125 ml of water, and 12.5 ml of concentrated hydrochloric acid are added to the solution. After cooling the solution to 0°–5°, the amine is diazotised by adding 25 ml of 2 N sodium nitrite solution dropwise, and the mixture is subsequently stirred for a further 30 minutes. Any excess of nitrite is removed with amidosulphonic acid.

The diazo compound is now gradually introduced into the solution of the coupling component prepared above and the pH value of the reaction mixture is kept at 7.5–8.0 with 20% strength sodium carbonate solution. The mixture is subsequently stirred for 1 hour and the temperature is then allowed to rise to 20° C. After the coupling reaction has ended, the pH value is adjusted to 6.5 and the dyestuff is salted out with 100 g of sodium chloride, whereupon it precipitates in small needles. It is filtered off, washed with 5% strength sodium chloride solution and dried at 40° in vacuo. The dyestuff corresponds, in the form of the free acid, to the formula

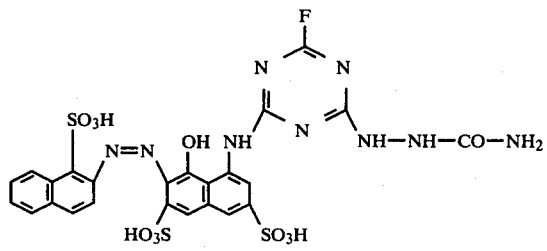

and dyes cotton in bluish-tinged red shades, which are fast to light and wet processing, from a long liquor by the process of Example 1.

EXAMPLE 19

16.0 g of 1-amino-8-hydroxynaphthalene-3,6-disulphonic acid are first subjected to a condensation reaction with 4.6 ml of cyanuric fluoride in the manner described in Example 6, and the intermediate product is reacted with 6.0 g of semicarbazide hydrochloride.

8.6 g of 2-aminobenzenesulphonic acid are dissolved, at pH 6, in 120 ml of water. The solution is cooled to 0°–5°, and 15 ml of concentrated hydrochloric acid are added. The amine is then diazotised with 25 ml of 2 N sodium nitrite solution. After subsequently stirring the mixture for half an hour, excess nitrite is removed with amidosulphonic acid. The diazo compound is gradually added to the solution of the reactive coupling component prepared above and the pH value of the coupling mixture is kept at 7.0–7.5 with 20% strength sodium carbonate solution. After subsequently stirring the mixture for one hour, the temperature is allowed to rise to 20°, and after the coupling reaction has ended, the pH value is adjusted to 6.5 and the dyestuff is salted out with 100 g of sodium chloride. The mixture is subsequently stirred for ½ an hour and filtered, and the product is washed with 20% strength sodium chloride solution. The dyestuff, of the formula

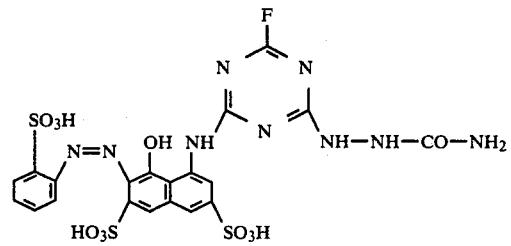

is dried at 40° in vacuo.

It dyes cotton in somewhat bluish-tinged red shades, with very good fastness to light and wet processing, from a long liquor at 30°.

EXAMPLE 20

20.0 g of 1-amino-4-(30-aminophenylamino)-anthraquinone-2,3'-disulphonic acid are dissolved, at pH 4.5, in 300 ml of water. The solution is cooled to 0°–5° and 4.2 ml of cyanuric fluoride are added dropwise in the course of 10 minutes. The pH value of the solution is kept at 4.2–4.6 with 2 N sodium carbonate solution. After the dropwise addition, the mixture is stirred at this pH value for a further 15 minutes, a solution, adjusted to pH 6.0, of 5.4 g of semicarbazide hydrochloride in 50 ml of water is then added and the pH value is then kept at 6.0–6.5. After subsequently stirring the mixture at this pH value and at 0°–5° for half an hour, the condensation reaction between the fluorotriazinyl component and semicarbazide has ended. The solution is warmed to 20° and allowed to run into a mixture of 100 ml of saturated potassium chloride solution and 100 g of potassium chloride. The dyestuff which has precipitated is filtered off and washed with 20% strength potassium chloride solution.

The dyestuff of the formula

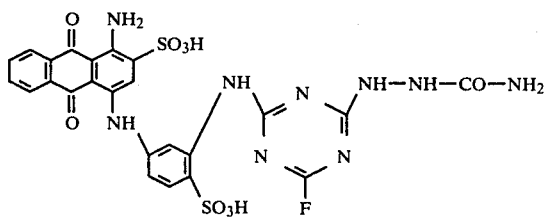

is dried at 40° in vacuo. Using this dyestuff, cotton can be dyed in neutral blue shades, which are fast to light and wet processing, from a long liquor by the process described in Example 1, or cellulose fabric is printed with a printing paste which contains, per kilogram, 40 g of the above dyestuff, 100 g of urea, 300 ml of water, 500 g of alginate thickener and 20 g of sodium carbonate and which has been made up to 1 kilogram with water, and the fabric is dried, steamed at 105° for 1 minute, rinsed with hot water and then soaped at the boil, rinsed and dried. A blue print with very good fastness properties is obtained.

EXAMPLE 21

16.0 g of 1-(2',5'-dichloro-4'-sulphophenyl)-3-methyl-4-(5''-amino-2''-sulphophenylazo)-5-pyrazolone are dissolved in 500 ml of water. The pH value is adjusted to 4.0, the solution is cooled to 0°-5° and 3.0 ml of cyanuric fluoride are added dropwise in the course of 10 minutes. During the dropwise addition, the pH value of the solution is kept at 3.5-4.0 with 2 N sodium carbonate solution.

The reaction has ended 15 minutes after the dropwise addition of the cyanuric fluoride. 4.5 g of semicarbazide hydrochloride and introduced and the pH value is rapidly adjusted to 6.0-6.5. This pH value is maintained further and the solution is warmed to 20° in the course of 2 hours. The resulting dyestuff of the formula

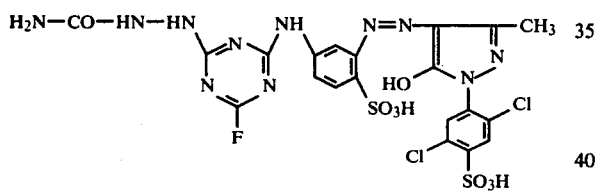

is slowly salted out with 80 g of potassium chloride, the suspension is subsequently stirred for 1 hour and filtered and the filter cake is washed with 10% strength potassium chloride solution. After drying at 40° in vacuo, a product which dyes cotton in clear greenish-tinged yellow shades, with very good fastness to light and wet processing, by the process of Example 1, is obtained.

EXAMPLE 22

16.0 g of 1-(2',5'-dichloro-4'-sulphophenyl)-3-methyl-4-(5''-amino-2''-sulphophenylazo)-5-pyrazolone in 500 ml of water are reacted with 3.0 ml of cyanuric fluoride at pH 3.5-4.0 in the manner described in Example 21. After the condensation reaction has ended, 6.3 g of benzenesulphonic acid hydrazide in 35 ml of sulpholane are added dropwise to the solution at 0°-5° and the pH value is kept at 5.0-5.2 with 2 N sodium carbonate solution. After 3 hours, the mixture is warmed to 20° in the course of one hour and the dyestuff is slowly salted out with 60 g of potassium chloride, filtered off and washed with 10% strength potassium chloride solution. Drying is carried out at 40° in vacuo. The dyestuff corresponds to the formula

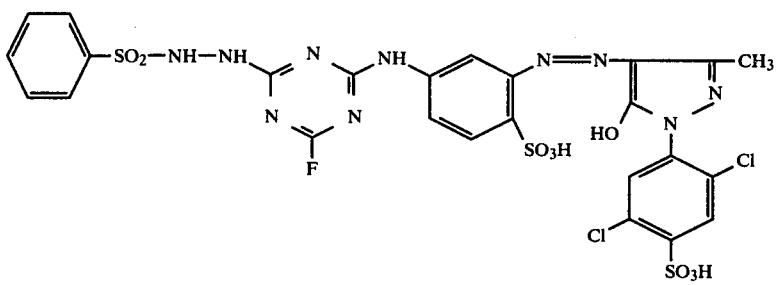

Using this dyestuff, greenish-tinged yellow prints which are very fast to light and wet processing can be obtained on cotton by the process of Example 20.

EXAMPLE 23

If the semicarbazide hydrochloride in Example 21 is replaced by 4.1 g of benzhydrazide and the procedure is otherwise as described in that example, a dyestuff of the formula

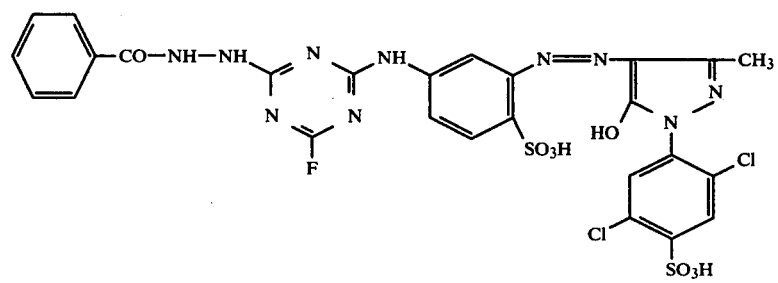

which likewise dyes cotton in greenish-tinged yellow shades which are fast to light and wet processing is obtained.

Comparable dyestuffs are obtained when the 2,4-diaminobenzenesulphonic acid, the 1-(2',5'-dichloro-4'-sulphophenyl)-3-methyl-5-pyrazolone and the hydrazide in Example 21 are replaced by the diazo components, coupling components and hydrazide components indicated in the table which follows.

| Example No. | Diazo component | Coupling component | Hydrazide | Colour shade |
| --- | --- | --- | --- | --- |
| 24 | 2,5-diaminobenzene- | 1-(4'-sulphophenyl)-5-pyrazolone-3- | semicarbazide | yellow |

-continued

| Example No. | Diazo component | Coupling component | Hydrazide | Colour shade |
|---|---|---|---|---|
| | sulphonic acid | carboxylic acid | | |
| 25 | 2,4-diaminobenzene-sulphonic acid | 3-methyl-5-pyrazolone | semicarbazide | greenish-tinged yellow |
| 26 | 2,4-diaminobenzene-sulphonic acid | 1-(2'-chloro-6'-methyl-4'-sulphophenyl)-3-methyl-5-pyrazolone | benzhydrazide | greenish-tinged yellow |
| 27 | 2,4-diaminobenzene-sulphonic acid | 1-(4'-sulphophenyl)-5-pyrazolone-3-carboxylic acid | semicarbazide | yellow |
| 28 | 2,4-diaminobenzene-sulphonic acid | 1-(2-carboxyethyl)-5-pyrazolone-3-carboxylic acid | semicarbazide | greenish-tinged yellow |
| 29 | 2,4-diaminobenzene-sulphonic acid | 1-(2-cyanoethyl)-5-pyrazolone-3-carboxylic acid | semicarbazide | greenish-tinged yellow |
| 30 | 2,4-diaminobenzene-sulphonic acid | 1-(3'-sulphophenyl)-3-methyl-5-pyrazolone-imide | semicarbazide | greenish-tinged yellow |
| 31 | 2,5-diaminobenzene-sulphonic acid | barbituric acid | semicarbazide | greenish-tinged yellow |
| 32 | 2,4-diaminobenzene-sulphonic acid | 1-(4',8'-disulphonaphthyl-2')-3-methyl-5-pyrazolone | 2-methyl-semicarbazide | yellow |
| 33 | 2,5-diaminobenzene-sulphonic acid | 1-(5',7'-disulphonaphthyl-2')-3-methyl-5-pyrazolone | acethydrazide | yellow |
| 34 | 2,4-diaminobenzene-sulphonic acid | 1-(4'-sulphophenyl)-3-methyl-5-pyrazolone | semicarbazide | greenish-tinged yellow |
| 35 | 2,4-diaminobenzene-sulphonic acid | 1-(2'-methyl-4'-sulphophenyl)-3-methyl-5-pyrazolone | benzenesulphonic acid hydrazide | greenish-tinged yellow |
| 36 | 2,4-diamino-5-chlorobenzene-sulphonic acid | 1-(3'-sulphophenyl)-3-methyl-5-pyrazolone | benzhydrazide | greenish-tinged yellow |
| 37 | 2,4-diaminobenzene-sulphonic acid | acetoacetic acid 3-sulpho-anilide | semicarbazide | greenish-tinged yellow |
| 38 | 2,5-diaminobenzene-sulphonic acid | acetoacetic acid 2-methyl-4-sulpho-anilide | semicarbazide | yellow |
| 39 | 2,4-diaminobenzene-sulphonic acid | 1-hydroxynaphthalene-3,7-disulphonic acid | semicarbazide | orange |
| 40 | 2,4-diaminobenzene-sulphonic acid | 1-hydroxynahphthalene-3,8-disulphonic acid | 1,2-dimethyl-semicarbazide | orange |
| 41 | 2,5-diaminobenzene-sulphonic acid | 8-hydroxynaphthalene-1,3-6-tri-sulphonic acid | semicarbazide | scarlet |
| 42 | 2,5-diaminobenzene-sulphonic acid | 1-hydroxynaphthalene-3,6-disulphonic acid | semicarbazide | red |
| 43 | 2,5-diaminobenzene-sulphonic acid | 1-hydroxy-7-(3'-sulphophenylamino)-naphthalene-3-sulphonic acid | semicarbazide | brown |
| 44 | 2,4-diaminobenzene-sulphonic acid | 1-hydroxy-7-(3'-sulphophenylamino)-naphthalene-3-sulphonic acid | semicarbazide | brown |
| 45 | 2,4-diaminobenzene-sulphonic acid | 1-hydroxy-7-amino-naphthalene-3-sulphonic acid (acid coupling) | semicarbazide | red |
| 46 | 2,4-diaminobenzene-sulphonic acid | 1-hydroxy-7-methylaminonaphthalene-3-sulphonic acid (acid coupling) | semicarbazide | bluish-tinged red |
| 47 | 2,4-diaminobenzene-sulphonic acid | 6-aminonaphthalene-1-sulphonic acid | semicarbazide | orange |
| 48 | 2,4-diaminobenzene-sulphonic acid | 6-aminonaphthalene-2-sulphonic acid | 2-methyl-4-ethyl semi-carbazide | orange |
| 49 | 2,5-diaminobenzene-sulphonic acid | 2,4-diamino-5-cyano-6-(3'-sulpho-phenyl)-pyridene | benzenesulphonic acid hydrazide | yellow |
| 50 | 2,4-diaminobenzene-sulphonic acid | 6-hydroxy-1,4-dimethyl-3-sulpho-methyl-2-pyridone | semicarbazide | greenish-tinged yellow |
| 51 | 2,4-diaminobenzene-sulphonic acid | 1-hydroxy-6-ureidonaphthalene-3-sulphonic acid | aminoguanidine | orange |
| 52 | 2,4-diaminobenzene-sulphonic acid | 1-hydroxy-7-aminonaphthalene-4-sulphonic acid (acid coupling) | semicarbazide | red |
| 53 | 2,4-diaminobenzene-sulphonic acid | 7-hydroxynaphthalene-1,3-disulphonic acid | semicarbazide | orange |
| 54 | 2,4-diaminobenzene-sulphonic acid | 1-hydroxynaphthalene-4-sulphonic acid | semicarbazide | orange |
| 55 | 2,5-diaminobenzene-sulphonic acid | 2,4-diamino-5-cyano-6-(3'-sulpho-phenyl)-pyridine | benzhydrazide | yellow |

EXAMPLE 56

16.0 g of 1-amino-8-hydroxynaphthalene-3,6-disulphonic acid are subjected to a condensation reaction with 4.6 ml of cyanuric fluoride in the manner described in Example 18. A solution of 6.9 g of benzhydrazide in 140 ml of water is added dropwise to the resulting solution at 0°–5° and the pH value of the condensation solution is kept, at 0°–5°, at 5.5–6.0 with 2 N sodium carbonate solution. After subsequently stirring the solution for 3 hours, the condensation reaction has ended. A diazonium salt solution or suspension which has been prepared from 8.6 g of 2-aminobenzene-sulphonic acid, 120 ml of water, 15 ml of concentrated hydrochloric acid and 25 ml of 2 N sodium nitrite solution is now added. During the addition of the diazonium salt and afterwards, the pH value of the coupling mixture is kept at 7.0–7.5 with 20% strength sodium carbonate solution. After the coupling reaction has ended, the temperature is allowed to rise to 20°, the pH value is adjusted to 6.0 and the dyestuff formed, of the formula

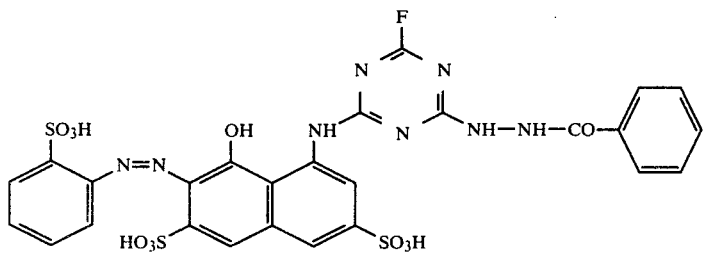

is salted out with 80 g of sodium chloride. It is filtered off, washed with 10% strength sodium chloride solution and dried at 40° in vacuo.

Using this dyestuff, somewhat bluish-tinged red colour shades which are fast to light and wet processing are obtained on cotton by the dyeing process of Example 1.

EXAMPLE 57

24.0 g of the disodium salt of 1-amino-4-(4'-aminophenylamino)-anthraquinone-2,2'-disulphonic acid are dissolved in 340 ml of water. The solution is adjusted to a pH value of 3.5 and cooled to 0°–5°.

4.4 ml of cyanuric fluoride are now allowed to run in over a period of 2–3 minutes and the pH value of the solution is kept at 3.2–3.5 with 2 N sodium carbonate solution, adequate cooling being ensured by adding ice. After the dropwise addition of the cyanuric fluoride, the mixture is subsequently stirred under the conditions indicated for a further 15 minutes, the pH value is then adjusted to 5.5 and a solution of 5.7 g of semicarbazide hydrochloride in 50 ml of water, which has previously been adjusted to pH 6 and cooled to 0°–5°, is added to the difluorotriazinylanthraquinone component. The pH value is kept at 6.0–6.5 by adding 2 N sodium carbonate solution dropwise.

After the condensation reaction has ended, which is indicated in the chromatogram by the disappearance of the difluorotriazinyl compound, the dyestuff is salted out with 75 g of sodium chloride, filtered off and washed with 10% strength sodium chloride solution.

The product, which can be assigned the formula

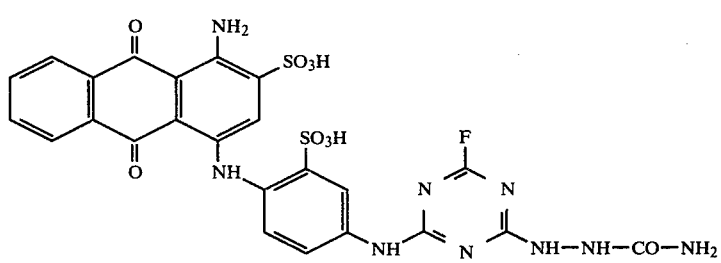

is dried at 40° in vacuo. It dyes cotton in a greenishtinged blue shade, with very good fastness to light and wet processing, from a long liquor by the dyeing process of Example 1.

EXAMPLE 58

18.3 g of 1-amino-4-(3'-amino-2'-methylphenylamino)anthraquinone-2,5-disulphonic acid are dissolved in 75 ml of tetramethylene sulphone and 10.8 ml of N,N-dimethylaniline and the solution is cooled to 0°–5°. 3.5 ml of cyanuric fluoride are added dropwise in the course of 15 minutes and the mixture is subsequently stirred for 15 minutes.

4.6 g of semicarbazide hydrochloride are dissolved, at pH 6, in 300 ml of water. The solution is cooled to 0°–5° and the solution of the difluorotriazinylanthraquinone component is now added dropwise to the aqueous semicarbazide solution in the course of 15–30 minutes. During this addition, the pH value of the aqueous-organic mixture is kept at 6.0–6.3 by means of 2 N sodium carbonate solution. After a subsequent stirring time of 2½ hours, the temperature is allowed to rise to 20° and 700 ml of saturated potassium chloride solution are then added dropwise.

The dyestuff which has precipitated, of the formula

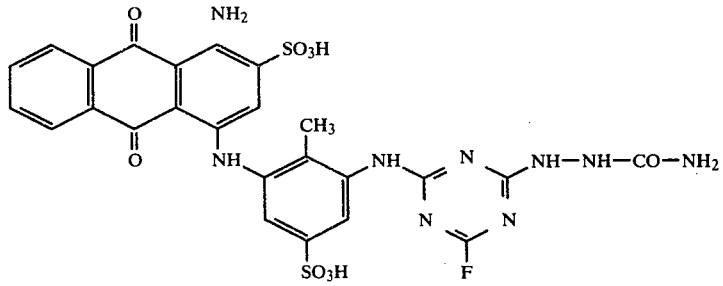

is filtered off, washed with 1 liter of 10% strength potassium chloride solution and dried at 40° in vacuo.

The dyestuff dyes cellulose fibres in neutral blue shades, which are fast to light and wet processing, by the dyeing process of Example 1.

In an analogous manner, instead of 1-amino-4-(3'-amino-2'-methylphenylamine)-anthraquinone-2-sulphonic acid, it is also possible to react equivalent amounts of 1-amino-4-(4'-aminophenylamino)-anthraquinone-2,2'-disulphonic acid or 1-amino-4-(4'-methylamino-phenyl-amino)-anthraquinone-2,2'-disulphonic acid.

resulting dyestuff, bluish-tinged red dyeings or prints which are fast to light and wet processing are obtained on cotton from a long liquor or, respectively, by printing.

Analogous dyestuffs giving the colour shades indicated are obtained when the diazo components, coupling components and hydrazides contained in the table which follows are employed instead of the 2-aminonaphthalene-1-sulphonic acid, the 1-amino-8-hydroxynaphthalene-3,6-disulphonic acid and the benzhydrazide.

| Example No. | Diazo component | Coupling component | Hydrazide component | Colour shade |
|---|---|---|---|---|
| 60 | 2-aminonphthalene-1,5-disulphonic acid | 1-amino-8-hydroxynaphthalene-3,6-disulphonic acid | semicarbazide | bluish-tinged red |
| 61 | 2-aminobenzene-sulphonic acid | 1-amino-8-hydroxynaphthalene-4,6-disulphonic acid | semicarbazide | red |
| 62 | 2-aminobenzene-1,4-disulphonic acid | 1-amino-8-hydroxynaphthalene-3,6-disulphonic acid | benzhydrazide | red |
| 63 | 2-amino-4-acetyl-aminobenzenesulphonic acid | 1-amino-8-hydroxynaphthalene-3,6-disulphonic acid | semicarbazide | bluish-tinged red |
| 64 | 2-amino-5-acetyl-aminobenzenesulphonic acid | 1-amino-8-hydroxynaphthalene-3,6-disulphonic acid | semicarbazide | red-violet |
| 65 | 2-aminoaphthalene-1,5-disulphonic acid | 1-amino-8-hydroxynaphthalene-3,6-disulphonic acid | benzhydrazide | bluish-tinged red |
| 66 | 2-aminoaphthalene-1,5-disulphonic acid | 1-amino-8-hydroxynaphthalene-3,6-disulphonic acid | benzenesulphonic acid hydrazide | bluish-tinged red |
| 67 | 2-animobenzene-sulphonic acid | 1-amino-8-hydroxynaphthalene-3,6-disulphonic acid | acethydrazide | red |
| 68 | 2-aminobenzoic acid | 1-amino-8-hydroxynaphthalene-3,6-disulphonic acid | semicarbazide | bluish-tinged red |
| 69 | 2-aminobenzene-sulphonic acid | 1-(4'-aminobenzoyl)-amino-8-hydroxynaphthalene-3,6-disulphonic acid | semicarbazide | bluish-tinged red | phonic acid.

EXAMPLE 59

16.0 g of 1-amino-8-hydroxynaphthalene-3,6-disulphonic acid are first subjected to a condensation reaction with 4.6 ml of cyanuric fluoride and the condensation product is then subjected to a condensation reaction with 6.9 g of benzhydrazide, in the manner described in Example 56.

11.1 g of 2-aminonaphthalene-1-sulphonic acid in 125 ml of water and 12.5 ml of concentrated hydrochloric acid are diazotised with 25 ml of 2 N sodium nitrite solution at 0°–5° and any excess nitrite is destroyed with amidosulphonic acid. The diazo compound is gradually introduced into the solution of the above coupling component at 0°–5° and the pH value is kept at 7.5–8.0 with 20% strength sodium carbonate solution. After the coupling reaction has ended, the pH value is adjjusted to 6.0 and the dyestuff formed, of the formula

EXAMPLE 70

16.0 g of 1-amino-8-hydroxynaphthalene-3,6-disulphonic acid are subjected to a condensation reaction with 4.6 ml of cyanuric fluoride in the manner described in Example 18. A solution, adjusted to pH 10–10..5, of benzenesulphonic acid hydrazide is then added dropwise at 0°–5° in a manner such that the pH value of the condensation mixture is kept at 5.0–5.5. The mixture is stirred for a further 2 hours, the pH value is maintained with 2 N sodium carbonate and the temperature is then allowed to rise to 20° in the course of 1 hour. 8.6 g of 2-amino-benzenesulphonic acid in 120 ml of water and 15 ml of concentrated hydrochloric acid are diazotised with 25 ml of 2 N sodium nitrite solution at 0°–5°. The diazo compound is gradually added to the solution, cooled to 0°–5°, of the above reactive condensation product and the coupling reaction is carried out at pH 7.0–7.5 by simultaneously adding 20% strength sodium

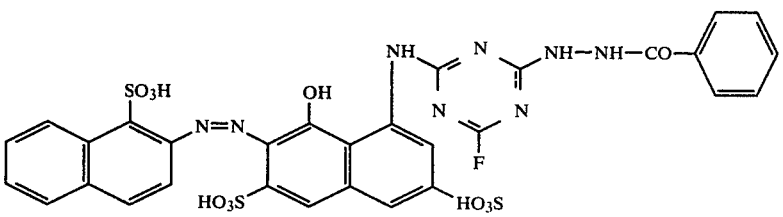

is further salted out with 90 g of sodium chloride. The product is filtered off, washed with 5% strength sodium chloride solution and dried at 40° in vacuo. Using the carbonate solution. After subsequently stirring the solution for one hour, the temperature is allowed to rise to 20°, the solution is adjusted to pH 6.0 and clarified with 5 g of active charcoal and the dyestuff is precipitated from the filtrate with 250 g of sodium chloride. The precipitated dyestuff of the formula

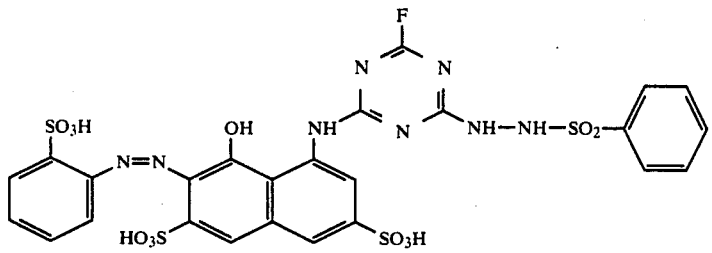

is filtered off, washed with 20% strength sodium chloride solution and dried at 40° in vacuo. The dyestuff gives somewhat bluish-tinged red shades, with good fastness to light and wet processing, from a long liquor at 40°.

EXAMPLE 71

25.8 g of dyestuff of the formula

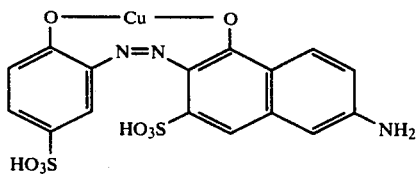

obtained by diazotising 1-hydroxy-2-aminobenzene-4-sulphonic acid and coupling the diazotisation product to 7-amino-1-hydroxynaphthalene-3-sulphonic acid in water/pyridine in the presence of sodium carbonate and subsequently treating the coupling product with a copper-donating agent, are dissolved, at pH 7, in 800 parts of water. The solution is cooled to 0°–5° and the pH value is adjusted to 6. 4.3 ml of cyanuric fluoride are now added dropwise in the course of 15 minutes and the pH value of the solution is kept at 5.5–6.0 with 2 N sodium carbonate solution. The solution is subsequently stirred for a further 30 minutes and a solution, adjusted to pH 6, of 5.6 g of semicarbazide hydrochloride is then added. The pH value is now kept at 6.0–6.5. After 3 hours, the temperature of the solution is allowed to rise to 20° and the dyestuff is salted out, filtered off, washed and dried at 40° in vacuo.

The dyestuff of the formula

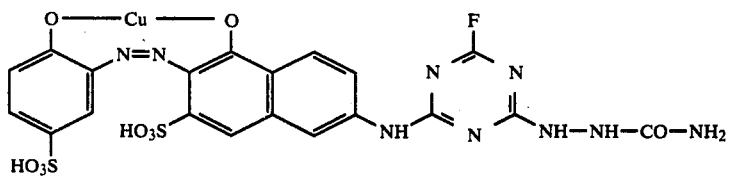

dyes cotton in ruby shades which are fast to light and wet processing.

EXAMPLE 72

32.7 g of a copper complex azo dyestuff which has been obtained from the diazonium salt of 1-amino-8-phenylsulphonyloxynaphthalene-3,6-disulphonic acid by coupling onto 6-acetyl-amino-1-hydroxynaphthalene-4,8-disulphonic acid at pH 8, oxidative coppering with copper sulphate and hydrogen peroxide and saponification of the N-acetyl groups and O-phenylsulphonyl groups are dissolved, at pH 5.5–6.0, in 1,200 ml of water. The solution is cooled to 0°–5° C. and 4.6 ml of cyanuric fluoride are added dropwise in the course of 15 minutes, the pH value of the solution being kept at 5.0–5.5. After the condensation reaction has ended, a solution, adjusted to pH 6, of 6.0 g of semicarbazide hydrochloride is added and the pH value is kept at 6.0–6.2 with 20% strength sodium carbonate solution.

After the condensation reaction has ended, the dyestuff is salted out with 300 g of sodium chloride, filtered off, washed and dried. It corresponds to the formula

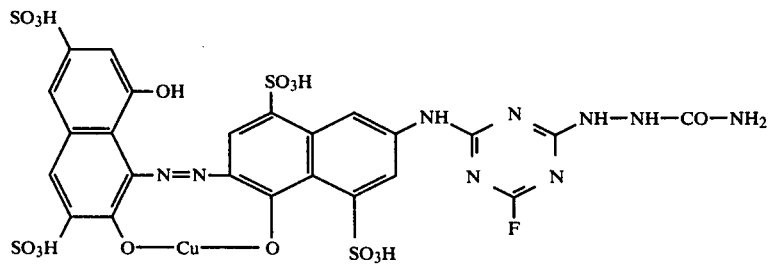

and dyes cotton in blue shades, which are very fast to light and wet processing, by the methods described.

EXAMPLE 73

An aqueous solution of 0.05 mols of the copper complex of the formula

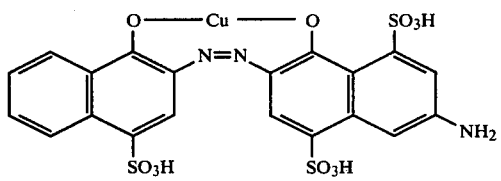

prepared according to the statements of German Patent Specification Nos. 1,061,460 and 1,085,988, is reacted with 4.7 ml of cyanuric fluoride at 0°–5° in the manner described, the pH value being kept at 4.5–5.0 with 2 N sodium carbonate solution. After the reaction has ended, an aqueous solution of benzhydride is added and the pH value is kept at 6.0–6.2. After the reaction has ended, the dyestuff is salted out, isolated and dried. The product of the formula

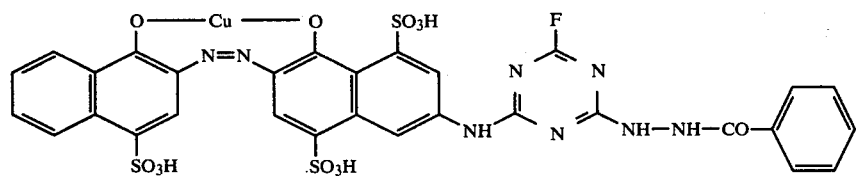

dyes cotton in violet shades, which are fast to light and wet processing, from a long liquor.

EXAMPLE 74

11.4 g of the disodium salt of 4-(4'-amino-2'-ureidophenylazo)-benzene-1,3-disulphonic acid are dissolved in 200 ml of water. The solution is cooled to 0°–5° and the pH value is adjusted to 5.0. 2.9 ml of cyanuric fluoride are now added dropwise and the pH value is kept at 4.5–5.0 with 2 N sodium carbonate solution. After a subsequent stirring time of 20 minutes, the reaction has ended. 3.8 g of semicarbazide hydrochloride are dissolved at pH 6, in 20 ml of water. This solution is added dropwise to the difluorotriazinyl dyestuff component and the pH value is kept at 6.0–6.2 with 2 N sodium carbonate solution. When the condensation reaction has ended, after about 3 hours, the mixture is warmed to 20° and the dyestuff formed, of the formula

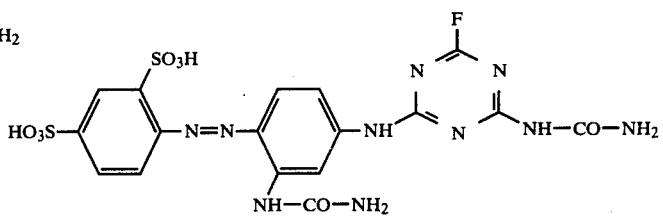

is salted out with 75 g of sodium chloride. It is filtered off, washed with 20% strength sodium chloride solution and dried at 50° in vacuo.

The dyestuff dyes cotton in golden yellow shades, with very good fastness to light and wet processing, from a long liquor at 40°.

Further analogous dyestuffs giving the colour shades indicated are obtained when the 4-aminobenzene-1,3-disulphonic acid, the 3-aminophenylurea and the semicarbazide in Example 74 are replaced by the diazo components, coupling components and hydrazide components indicated in the table which follows.

| Example No. | Diazo component | Coupling component | Hydrazide | Colour shade |
|---|---|---|---|---|
| 75 | 7-amino-naphthalene-1,3-6-trisulphonic acid | 3-aminophenylurea | benzhydrazide | yellow |
| 76 | 3-aminonaphthalene-1,5-disulphonic acid | 3-aminotoluene | semicarbazide | yellow |
| 77 | 3-aminonaphthalene-1,5-disulphonic acid | 3-aminoacetanilide | semicarbazide | yellow |
| 78 | 7-aminonaphthalene-1,3-6-trisulphonic acid | 3-aminotoluene | semicarbazide | yellow |
| 79 | 7-aminonaphthalene-1,3-disulphonic acid | 3-aminophenylurea | semicarbazide | yellow |
| 80 | 7-aminonaphthalene-1,3-disulphonic acid | 3-aminotoluene | acethydrazide | yellow |
| 81 | 2-aminonaphthalene-1,5-disulphonic acid | 3-aminoacetanilide | semicarbazide | yellow |
| 82 | 2-aminobenzene-1,4-disulphonic acid | 3-aminophenylurea | thiosemicarbazide | yellow |
| 83 | 4-aminobenzene-1,3-disulphonic acid | 3-methylaminotoluene | semicarbazide | yellow |
| 84 | 3-aminonaphthalene-1,5-disulphonic acid | 3-aminophenylurea | semicarbazide | yellow |
| 85 | 7-aminonaphthalene-1,3-6-trisulphonic acid | 3-aminophenylurea | semicarbazide | yellow |

EXAMPLE 86

20.0 g of the disodium salt of 1-amino-4-(4'-aminophenylamino)-anthraquinone-2,3'-disulphonic acid are dissolved in 500 ml of water. The solution is cooled to 0°–5°, the pH value is adjusted to 4.5 and 3.5 ml of cyanuric fluoride are added dropwise in the course of 10 minutes. During the dropwise addition and subsequent stirring for a quarter of an hour, the pH value is kept at 4.5 with 2 N sodium carbonate solution. 7.1 g of benzenesulphonic acid hydrazide are added to the solution. The condensation reaction between the hydrazide and the difluorotriazinyl dyestuff is carried out by maintaining a pH value of 4.9–5.1. It has ended after 2–3 hours. the mixture is warmed to 20° and the dyestuff is salted out with 80 g of potassium chloride in the course of one hour. After filtering off, washing with 15% strength potassium chloride solution and drying at 40° in vacuo, the dyestuff of the formula 4.2–4.6 with 2 N sodium carbonate solution. After subsequently stirring the solution for 15 minutes, 6.1 g of benzoic acid hydrazide are added and the pH value is now kept at 6.0. When the condensation reaction between the difluorotriazinyl dyestuff and the hydrazide

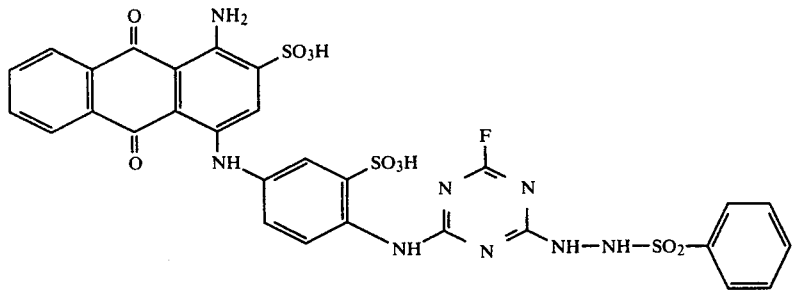

which dyes cotton in greenish-tinged blue shades which are fast to light and wet processing is obtained.

has ended, the mixture is warmed to 20° and the dyestuff of the formula

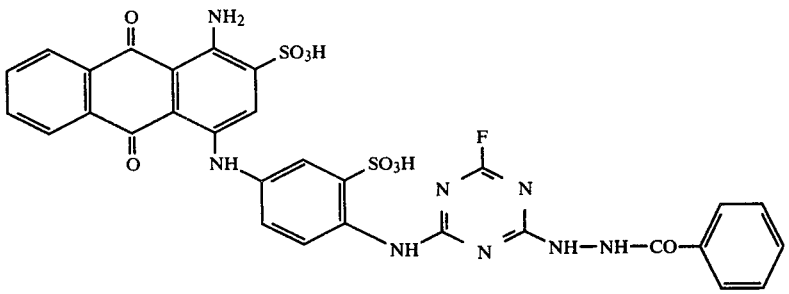

EXAMPLE 87

If 18.3 g of 1-amino-4-(3'-amino-phenylamino)-anthraquinone-2,4'-disulphonic acid is employed instead of the 20 g of the anthraquinone component in Example 86 and the further procedure is as in Example 86, and at the end the dyestuff is salted with 100 g of sodium chloride and washed, after filtering off, with 15% strength sodium chloride solution, after drying, a product which corresponds to the formula is salted out with 100 g of sodium chloride in the course of 1 hour, filtered off and washed with 15% strength sodium chloride solution. It dyes cotton in a greenish-tinged blue shade by the dyeing process of Example 1.

EXAMPLE 89

16.0 g of 1-amino-4-(3'-aminophenylamino)-anthraquinone-2,4'-disulphonic acid are dissolved, at pH 4.5, in 300 ml of water. After cooling the solution to 0°–5°, 3.4 ml of cyanuric fluoride are added dropwise in

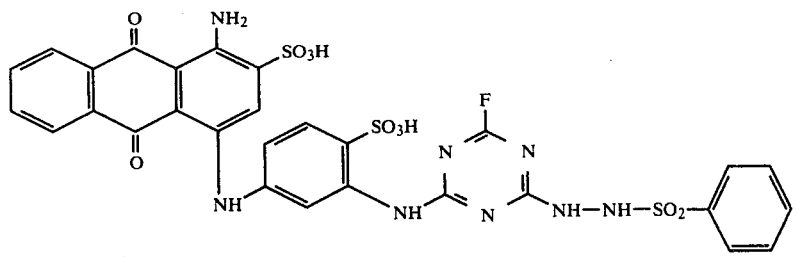

and dyes cotton in neutral blue shades, which are fast to light and wet processing, from a long liquor is obtained.

EXAMPLE 88

20.0 g of the disodium salt of 1-amino-4-(4'-aminophenylamino)-anthraquinone-2,3'-disulphonic acid are dissolved in 450 ml of water. The solution is cooled to 0°–5°, the pH value is adjusted to 4.5 and 3.8 ml of cyanuric fluoride are added dropwise in the course of 10 minutes. During this addition, the pH value is kept at the course of 10 minutes and the pH value is kept at 4.2–4.5. The condensation reaction is brought to completion by subsequently stirring the mixture for a quarter of an hour. A solution of 5.4 g of benzhydrazide in 100 ml of water is now added and the pH value is kept at 6.0 with 2 N sodium carbonate solution. When the condensation reaction has ended, after about 3 hours, the solution is warmed to 20° and the dyestuff is salted out with 110 g of sodium chloride. The dyestuff, which corresponds to the formula

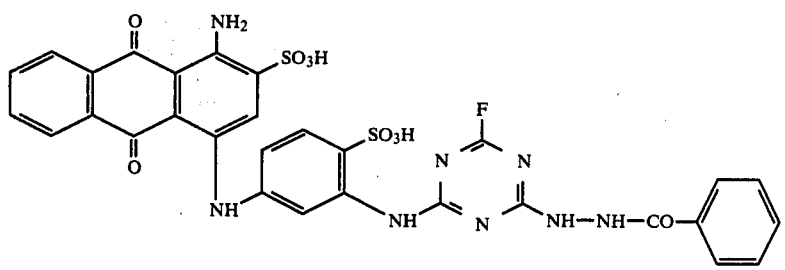

is filtered off, washed with 15% strength sodium chloride solution and dried at 40° in vacuo. It dyes cotton in blue shades by the dyeing process described in Example 1.

In an analogous manner, further reactive dyestuffs are obtained when the anthraquinone components and hydrazides indicated in the table which follows are subjected to a condensation reaction with cyanuric fluoride.

| Example No. | Anthraquinone component | Hydrazine component | Colour shade on cotton |
|---|---|---|---|
| 90 | 1-amino-4-(5'-amino-2'-methylphenylamino)-anthraquinone-2,4-'disulphonic acid | semicarbazide | blue |
| 91 | 1-amino-4-(5'-amino-2',4',6'-trimethylphenylamino)-anthraquinone-2,3'-disulphonic acid | benzhydrazidle | reddish-tinged blue |
| 92 | 1-amino-4-(5'-amino-2',6'-dimethylphenylamino)-anthraquinone-2,4'- and 2,3'-disulphonic acid | semicarbazide | reddish-tinged blue |
| 93 | 1-amino-4-(4'-aminophenylamino)-anthraquinone-2,3'-disulphonic acid | acethydrazide | greenish-tinged blue |
| 94 | 1-amino-4-(4'-aminophenylamino)-anthraquinone-2,4',6-trisulphonic acid | semicarbazide | greenish-tinged blue |
| 95 | 1-amino-4-(5'-amino-2'-methoxyphenylamino)-anthraquinone)-2,4'-disulphonic acid | semicarbazide | greenish-tinged blue |
| 96 | 1-amino-4-(3'-aminophenylamino)-anthraquinone-2,4',5-trisulphonic acid | benzenesulphonic acid hydrazide | greenish-tinged blue |
| 97 | 1-amino-4-(3'-aminophenylamino)-anthraquinone-2,4',5-trisulphonic acid | semicarbazide | greenish-tinged blue |
| 98 | a mixture of 1-amino-4-(4'-aminophenylamino)-anthraquinone-2,3',5- and 2,3',8-trisulphonic acid | semicarbazide | greenish-tinged blue |
| 99 | 1-amino-4-(3'-aminophenylamino)-anthraquinone-2,7-disulphonic acid | semicarbazide | somewhat greenish tinged blue |
| 100 | 1-amino-4-(6'-aminomethyl-4'-methylphenylamino)-anthraquinone-2,2'-disulphonic acid | benzhydrazide | reddish-tinged blue |
| 101 | 1-amino-4-(4'-methylaminophenylamino)-anthraquinone-2,2'-disulphonic acid | benzhydrazide | greenish-tinged blue |
| 102 | 1-amino-4-(3'-methylaminomethyl-2',6'-dimethylphenylamino)-anthraquinone-2,3'- and 2,4'-disulphonic acid | semicarbazide | reddish-tinged blue |
| 103 | 1-amino-4-(3'-amino-4'-methylphenylamino)-anthraquinone-2,2'-disulphonic acid | semicarbazide | blue |
| 104 | 1-amino-4-(4'-methylaminomethylphenylamino)-anthraquinone-2,2'-disulphonic acid | benzenesulphonic acid hydrazide | blue |
| 105 | 1-amino-4-(4'-aminophenylamino)-anthraquinone-2,6-disulphonic acid | semicarbazide | greenish-tinged blue |
| 106 | 1-amino-4-(3'-aminophenylamino)-anthraquinone-2,6-disulphonic acid | aminouanidine | somewhat greenish tinged blue |

EXAMPLE 107

28.9 g of 2-amino-1-methylbenzene-3,5-disulphonic acid (monosodium salt) are diazotised and the diazo compound is coupled with 13.7 g of 1-amino-2-methoxy-5-methylbenzene in a weakly acid medium. The resulting monoazo dyestuff is isolated and then diazotised, or is diazotised immediatelly in solution without isolation, and the diazotisation product is coupled with 25.3 g of 2-methylamino-5-hydroxynaphthalene-7-sulphonic acid under alkaline conditions. The resulting disazo dyestuff is salted out by adding sodium chloride and filtered off and the isolated product is metallised with about 50 g of crystalline copper sulphate, 40 g of diethanolamine and 50 g of ammonia (D: 0.88) at 95°–100° C. in the course of 5 hours. The dyestuff is isolated from the coppering solution by adding salt and carefully acidifying.

The coppered amino-disazo dyestuff is now acylated with 8.1 ml of cyanuric fluoride at pH 4.5–5 and at a temperature of 0°–5° C., the pH value being kept within the range indicated by adding sodium carbonate. After the reaction has ended, a neutralised solution of 10.6 g of semicarbazide hydrochloride is added and the pH value is then kept at 6.0–6.5. The resulting solution is warmed to 20° for a further 3 hours and the dyestuff is salted out, isolated, washed and dried at 35° in vacuo.

The dyestuff corresponds to the formula

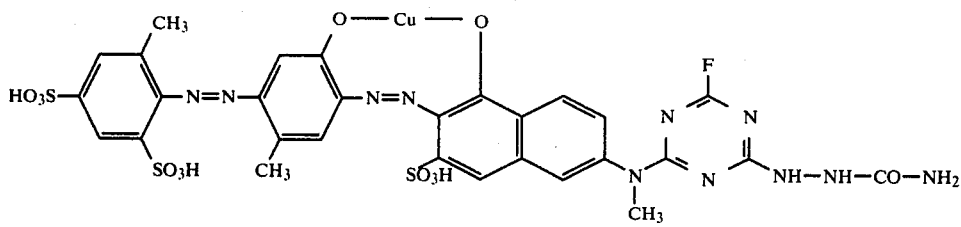

and dyes cotton in navy blue shades, which are fast to light and wet processing, from a long liquor.

EXAMPLE 108

35.0 g of a dyestuff component which is formed by reacting 1 mol of copper phthalocyanine-3,3',3'',3'''-tetrasulphonic acid chloride with 1 mol of 3-aminoacetanilide, subsequently saponifying the unreacted sulphochloride groups and then saponifying the acetylamino group in hot dilute hydrochloric acid, are dissolved, at pH 6-7, in 700 ml of water. After cooling the solution to 0°-5°, the pH value is adjusted to 4.5 and 3.6 ml of cyanuric fluoride are added dropwise in the course of 5 minutes, during which the pH value is kept between 4.0 and 4.3 by adding 20% strength sodium carbonate solution dropwise. After the reaction has ended and the consumption of sodium carbonate has ceased, a solution, adjusted to pH 6.0, of 4.7 g of semicarbazide hydrochloride in 20 ml of water is added and the pH value is now kept at 6.0-6.5 with sodium carbonate solution.

When the condensation reaction between the difluorotriazinyl dyestuff and the hydrazine has ended, after 3 hours, the solution is warmed to 20° and the dyestuff of the formula

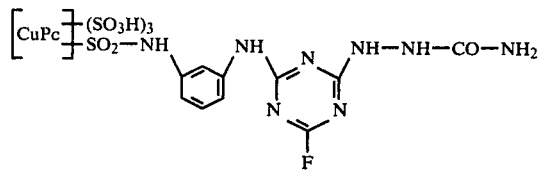

[CuPc] = copper phthalocyanine
is salted out with sodium chloride, filtered off and washed with sodium chloride solution. It is dried at 40° in vacuo.

The dyestuff gives turquoise blue colour shades, which are fast to light and wet processing, on cottom from a long liquor.

Further blue or green dyestuffs are obtained when the phthalocyanine components which follow are subjected to a condensation reaction with cyanuric fluoride and semicarbazide:

| Example No. | Phthalocyanine component | Colour shade |
|---|---|---|
| 109 | Copper phthalocyanine-3,3',3''-(trisulphonic acid)-3'''-sulphonic acid 3-amino-4-sulpho-phenylamide | turquoise |
| 110 | Copper phthalocyanine-3,3',3''-(trisulphonic acid)-3'''-sulphonic acid 4-amino-3-sulpho-phenylamide | " |
| 111 | Copper phthalocyanine-3,3',3''-(trisulphonic acid)-3'''-sulphonic acid 4-amino-phenylamide | " |
| 112 | Copper phthalocyanine-3,3',3''-(trisulphonic acid)-3'''-sulphonic acid 2-aminoethylamide | " |
| 113 | Copper phthalocyanine-3,3'-(disulphonic acid)-3''-sulphonic acid 3-amino-4-sulpho-phenylamide | " |
| 114 | Copper phthalocyanine-3,3'-(disulphonic acid)-3''-sulphonic acid 4-amino-3-sulphophenylamide | " |
| 115 | Copper phthalocyanine-3,3',3''-(trisulphonic acid)-3'''-sulphonic acid 4-amino-3-carboxyphenylamide | " |
| 116 | Nickel phthalocyanine-3,3',3''-(trisulphonic acid)-3'''-sulphonic acid 3-aminophenylamide | bluish-tinged green |
| 117 | Nickel phthalocyanine-3,3',3''-(trisulphonic acid)-3'''-sulphonic acid 4-amino-3-sulpho-phenylamide | bluish-tinged green |
| 118 | Nickel phthalocyanine-3,3',3''-(trisulphonic acid)-3'''-sulphonic acid 4-aminophenylsulphamide | bluish-tinged green |
| 119 | Copper phthalocyanine-3,3',3''-(trisulphonic acid)-3'''-sulphonic acid 4-amino-2-sulphophenylamide | turquoise |
| 120 | Copper phthalocyanine-3,3',3''-(trisulphonic acid)-3'''-sulphonic acid 5-amino-2-sulphophenylamide | " |
| 121 | Copper phthalocyanine-4,4',4''-(trisulphonic acid)-4'''-sulphonic acid 3-aminophenylamide | " |

EXAMPLE 122

38.9 g of the dyestuff obtained from 6-nitro-2-diazo-1-hydroxybenzene-4-sulphonic acid and 2-hydroxynaphthalene were coupled under alkaline conditions, using sodium carbonate, and stirred with 200 parts of water at pH 8 at a temperature of 70°-80° C. 67.9 g of the chromium complex compound of the azo dyestuff obtained from 4-chloro-2-diazo-1-hydroxybenzene-6-sulphonic acid and 1-amino-8-hydroxynaphthalene-3,6-disulphonic acid, containing 1 chromium atom per 1 molecule of dyestuff, are introduced into this suspension, the pH value being kept between 7 and 9 by adding sodium carbonate solution dropwise. After 20 minutes at 70°–80° C., a dark blue solution has formed. The paper chromatogram shows that a single mixed complex has formed. The mixed complex is acylated with 9.4 ml of cyanuric fluoride at 0°–5° and at pH 4.5–5.0 in the course of one hour, the pH being kept within the ranges indicated by adding sodium carbonate solution dropwise. After the reaction has ended, a neutralised solution of 12.3 g of semicarbazide hydrochloride in water is added and the pH value of the reaction mixture is kept at 6.0–6.2. After 3 hours, the temperature is allowed to rise to 20° and the resulting dyestuff is isolated by salting out with 20% of potassium chloride, filtered off and dried at 40° in vacuo. The dyestuff of the formula

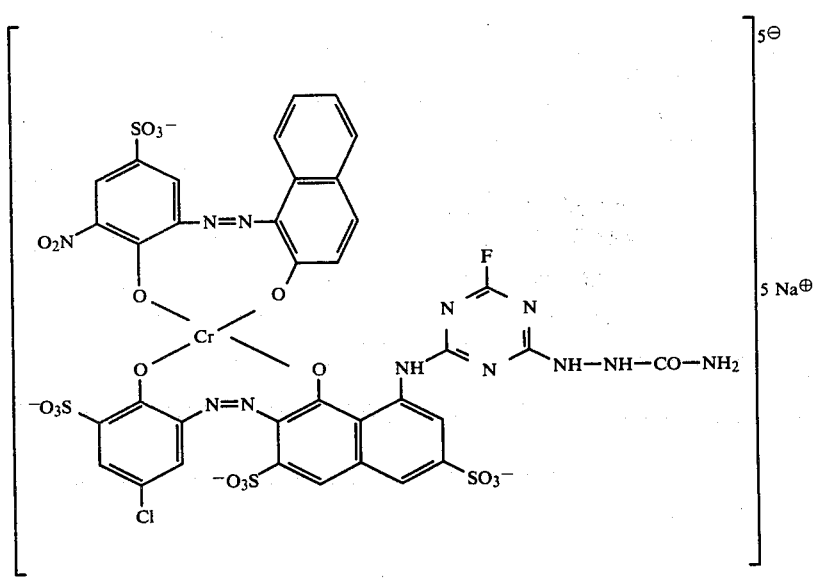

dyes cotton in grey to black shades, which are fast to light and wet processing, by the processes indicated.

Valuable dyestuffs can likewise be obtained in the manner indicated in this example from the starting components indicated in the table which follows. For the preparation of these dyestuffs, the azo dyestuff, which carries the reactive group in the 2:1 mixed complex, is always employed as the 1:1 chromium complex.

| Example No. | 1:1 chromium complex | Metal-free dyestuff | Hydrazide | Colour shade on cotton |
|---|---|---|---|---|
| 123 | 4-nitro-2-amino-1-hydroxy-benzene-6-sulphonic acid→1-amino-8-hydroxynaphthalene-3,6-disulphonic acid | 4-nitro-2-amino-1-hydroxy-benzene→2-hydroxynaphthalene | semicarbazide | black |
| 124 | 4-nitro-2-amino-1-hydroxy-benzene-6-sulphonic acid→1-amino-8-hydroxynaphthalene-3,6-disulphonic acid | 4-nitro-2-amino-1-hydroxy-benzene→1-hydroxynaphthalene-4-sulphonic acid | benzhydrazide | navy blue |
| 125 | 4-nitro-2-amino-1-hydroxy-benzene-6-sulphonic acid→1-amino-8-hydroxynaphthalene-3,6-disulphonic acid | 6-nitro-1-amino-2-hydroxy-naphthalene-4-sulphonic acid→2-hydroxynaphthalene | semicarbazide | blue-black |
| 126 | 4-nitro-2-amino-1-hydroxy-benzene-6-sulphonic acid→1-amino-8-hydroxynaphthalene-4,6-disulphonic acid | 4-nitro-2-amino-1-hydroxy-naphthalene-6-sulphonic acid→2-hydroxynaphthalene | semicarbazide | black |
| 127 | 4-chloro-2-amino-1-hydroxy-benzene-6-sulphonic acid→1-amino-8-hydroxynaphthalene-3,6-disulphonic acid | 4-nitro-2-amino-1-hydroxy-benzene→2-hydroxynaphthalene-6-sulphonic acid | benzenesulphonic acid hydrazide | blue-black |
| 128 | 4-chloro-2-amino-1-hydroxy-benzene-6-sulphonic acid→1-amino-8-hydroxynaphthalene-3,6-disulphonic acid | 4-nitro-2-amino-1-hydroxy-benzene→1-amino-8-hydroxynaphthalene-2,4-disulphonic acid | semicarbazide | navy blue |
| 129 | 4-chloro-2-amino-1-hydroxy-benzene-6-sulphonic acid→1-amino-8-hydroxynaphthalene-3,6-disulphonic acid | 2-amino-5-sulphobenzoic acid→1-phenyl-3-methyl-5-pyrazolone | semicarbazide | grey-green |

EXAMPLE 130

0.05 mol of a paste of the aminoazo compound of the formula

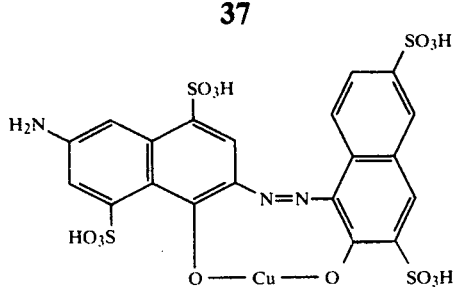

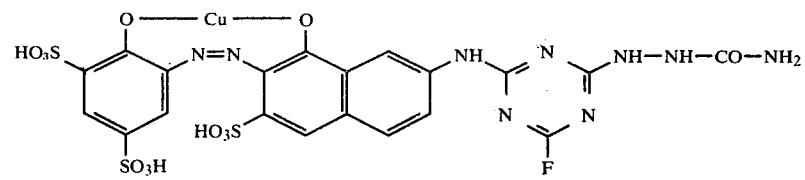

which is obtained by coupling the diazonium compound obtained from 6-acetamino-2-aminonaphthalene-4,8-disulphonic acid with 2-hydroxynaphthalene-3,6-disulphonic acid, saponifying the coupling product and converting the monoazo compound into the copper complex, are dissolved, at pH 6.5, in 1,000 ml of water. 4.5 ml of cyanuric fluoride are added dropwise to the solution, cooled to 0°–5°, and the pH value of the solution is kept at 5.0–5.5. When the reaction has ended, a neutralised solution of 5.9 g of semicarbazide hydrochloride in 30 ml of water is added dropwise and the pH value is kept at 6.0–6.5. After the condensation operation has ended, the dyestuff is salted out, filtered off, washed and dried at 40°. It dyes cotton in bluish-tinged violet shades by the processes indicated.

EXAMPLE 131

30 g of a dyestuff which has been obtained by coupling diazotised 5-amino-4-hydroxybenzene-1,3-disulphonic acid to 7-amino-1-hydroxynaphthalene-3-sulphonic acid and coppering the resulting azo dyestuff, are dissolved, at pH 7, in 250 ml of water. The solution is cooled to 0°–5° and the pH value is adjusted to 5.0. 4.6 ml of cyanuric fluoride are added dropwise at a pH value of 4.5–5.0 in the course of 10 minutes. After the reaction has ended, the product is then subjected to a condensation reaction with a neutralised solution of 6.0 g of semicarbazide hydrochloride at pH 6.0–6.5.

The reactive dyestuff formed, of the formula is salted out, filtered off, washed and dried at 40° in vacuo.

It dyes cotton in ruby shades, which are very fast to light and wet processing, from a long liquor.

The table which follows gives the diazo components and coupling components of further aminoazo dyestuffs which, after reaction with cyanuric fluoride and the hydrazides indicated, give reactive dyestuffs which produce, on cellulose fibres, the shade indicated. The preparation of the aminoazo components, their metallisation and the reaction of the metallised products with cyanuric fluoride as well as the condensation reaction with the hydrazides can be carried out as in Example 71.

| Example No. | Diazo component | Coupling component | Complexing metal | Hydrazide | Colour shade |
|---|---|---|---|---|---|
| 132 | 2-amino-1-hydroxybenzene-4-sulphonic acid | 7-methylamino-1-hydroxy-naphthalene-3-sulphonic acid | Cu | benzoic acid 2-methylhydrazide | ruby |
| 133 | 1-amino-2-hydroxy-6-nitro-naphthalene-4-sulphonic acid | 7-amino-1-hydroxynaphthalene-3-sulphonic acid | Cr | semicarbazide | greenish-tinged grey |
| 134 | 1-amino-2-hydroxy-5-methyl-sulphonylbenzene | 1-amino-8-hydroxynaphthalene-3,6-disulphonic acid | Cu | semicarbazide | violet |
| 135 | 1-amino-2-hydroxy-5-methyl-sulphonylbenzene | 1-amino-8-hydroxynaphthalene-3,6-disulphonic acid | Co | semicarbazide | grey |
| 136 | 1-amino-2-hydroxy-5-methyl-sulphonylbenzene | 1-amino-8-hydroxynaphthalene-3,6-disulphonic acid | Cr | semicarbazide | greenish tinged black |
| 137 | 5-amino-4-hydroxybenzene-1,3-disulphonic acid | 7-ethylamino-1-hydroxy-naphthalene-3-sulphonic acid | Cu | benzhydrazide | ruby |
| 138 | 5-amino-4-hydroxybenzene-1,3-disulphonic acid | 1-amino-8-hydroxynaphthalene-4,6-disulphonic acid | Cu | semicarbazide | violet |
| 139 | 5-amino-4-hydroxybenzene-1,3-disulphonic acid | 1-amino-8-hydroxynaphthalene-4,6-disulphonic acid | Cu | benzenesulphonic acid hydrazide | violet |

EXAMPLE 140

The diazonium salt, obtained from 24, 6 g 2-amino-6-acetylaminophenol-4-sulonic acid is coupled at pH 9 with the hydrazone obtained in the usual way from 10.6 g benzaldehyde and 15.2 g 2-hydrazinobenzoic acid. The coupling product is heated for 1 hour at 95° C. at pH 10 in order to saponify the acetylamino group. Thereafter the pH is adjusted to 3 with concentrated hydrochloric acid and the formazane reacted with 25,0 g copper-II-sulfate in the usual way. The reaction product is salted out and filtered off. The wet paste is mixed with 500 ml water, the pH adjusted to 5 and the temperature to 0°–5° C. and 10 ml cyanuric fluoride added dropwise while maintaining a pH of 4,5–5,0. After completion of the condensation the pH is adjusted to 6–6,5 and the temperature to 0° C., thereafter a neutral solution of semicarbazide (obtained from 6,0 g semicarbaxide hydrochloride) is added. Within 2 hours the temperature is allowed to raise to 20° C. The resulting dyestuff of the formula $$\text{[Cu-Komplex structure with COOH, HO, HN, SO}_3\text{H, F, NH—NH—CO—NH}_2\text{ substituents]}$$

Cu-Komplex is isolated in the usual way and dried in a vacuum at 30° C. It dyes cotton in blue shade. The dyeings exhibit good fastness to light and wet processing.

We claim:

1. Reactive dyestuffs of the formula $$\text{D-(T)}_m$$

wherein
D = the radical of an organic dyestuff,
m = 1–4 and
T =

$$-\text{X}-\text{W}-\text{Y}-\underset{\underset{\text{F}}{|}}{\overset{\text{N}}{\underset{\text{N}}{\bigcirc}}}-\underset{R_2}{\overset{}{\text{N}}}-\underset{R_3}{\overset{}{\text{N}}}-\text{acyl}$$

wherein
X and Y = a direct bond or a bridge member,
W =

$$-\underset{R_1}{\overset{}{\text{N}}}-$$

or -O-,
acyl = an acyl radical and
$R_1$–$R_3$ = H, alkyl or aralkyl,
the radical T being bonded, via X to a C atom of an aromatic-carbocyclic or aromatic-heterocyclic ring of the chromophore.

2. Azo dyestuffs of the formula $$[\text{A—N=N—B}]\text{—T}$$

wherein
A represents a radical of a heterocyclic or carbocyclic diazo component, preferably from the benzene, naphthalene or triazole series, and
B represents a radical of a heterocyclic, carbocyclic or CH-acid coupling component, in particular a radical of an optionally further substituted phenol, naphthol, aniline, naphtylamine, 5-aminopyrazole, 5-pyrazolone, aminopyridine, acetoacetic acid arylide, indole or pyrimidine, and T has the meaning indicated in claim 1.

3. Azo dyestuffs of the formula $$\left[ A_1-N=N-\underset{R_8}{\overset{R_6}{\bigcirc}}-Z \right]-T$$

wherein
$A_1$ = a phenyl or naphthyl radical optionally substituted by sulpho, carboxyl, nitro, chlorine, $C_1$-$C_4$-alkyl, $C_1$-$C_4$-alkoxy, phenyl or naphthyl which are optionally substituted by sulpho, amino or $C_1$-$C_4$-alkyl, amino, acetylamino, phenylazo or naphthylazo which are optionally substituted by amino, sulpho or $C_1$-$C_4$-alkyl, sulpho, $C_1$-$C_4$-alkoxy or hydroxyl, or trifluoromethyl,
Z = H, hydroxyl, alkoxy which is optionally substituted by hydroxyl or $C_1$-$C_4$-alkoxy or amino which is optionally substituted by $C_1$-$C_4$-alkyl, phenyl or benzyl, it being possible for alkyl to be further substituted by cyano, hydroxyl or $C_1$-$C_4$-alkoxy and for phenyl and benzyl to be further substituted by methyl, methoxy, chlorine, nitro or sulpho, $R_6$, $R_7$ and $R_8$ hydrogen, $C_1$-$C_4$-alkyl, $C_1$-$C_4$-alkoxy, amino, $C_1$-$C_4$-alkylcarbonylamino, phenyl which is optionally substituted by $C_1$-$C_4$-alkyl, amino, hydroxyl, sulpho or ureido, and
T = the meaning indicated in claim 1.

4. Azo dyestuffs of the formula $$\left[ A_1-N=N-\text{(naphthyl with } R_6, R_7, R_8, Z\text{)} \right]-T$$

wherein
$A_1$, $R_6$, $R_7$, $R_8$, T and Z have the meaning given in claim 3.

5. Azo dyestuffs of the formula $$\left[ A_1-N=N-\underset{Z_1}{\overset{R_9}{\bigcirc}}\underset{R_{10}}{\overset{N}{\diagdown}} \right]-T$$

wherein
$A_1$ and T have the meaning given in claim 3,
$Z_1$ = amino or hydroxyl,
$R_9$ = $C_1$-$C_4$-alkyl, preferably methyl, or carboxyl, and $R_{10}$ = phenyl or naphthyl which are optionally substituted by chlorine, $C_1$-$C_4$-alkyl, sulpho, $C_1$-$C_4$-alkoxy or amino.

6. Azo dyestuffs of the formula

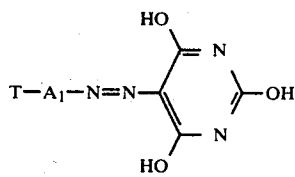

wherein

T and $A_1$ have the meaning given in claim 5.

7. Azo dyestuffs of the formula

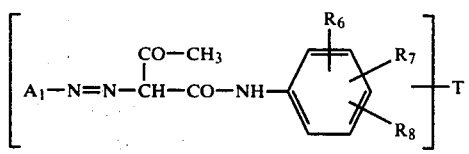

wherein

T, $A_1$, $R_6$, $R_7$ and $R_8$ have the meaning given in claim 5.

8. Azo dyestuffs of the formula

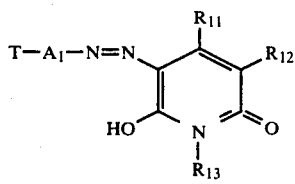

wherein $R_{11}$ denotes $C_1$-$C_4$-alkyl, aryl, carboxyl or hydroxyl, $R_{12}$ denotes cyano, carboxyl, sulpho, sulpho-$C_1$-$C_4$-alkyl or aminocarbonyl, $R_{13}$ denotes hydrogen, $C_1$-$C_4$-alkyl, aryl or aralkyl and T and $A_1$ have the meaning given in claim 5.

9. Azo dyestuffs of the formula

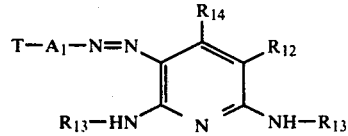

wherein

T, $R_{12}$ and $A_1$ have the meaning given in claim 8, $R_{14}$ = $C_1$-$C_4$-alkyl or amino and $R_{15}$ = hydrogen or $C_1$-$C_4$-alkyl.

10. Dyestuffs of anyone of claims 3 to 7, wherein $A_1$ denotes the radical of the formula

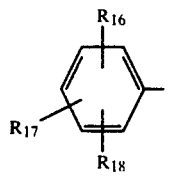

wherein $R_{16}$ denotes hydrogen, sulpho, hydroxyl, carboxyl or amino, $R_{17}$ denotes hydrogen, chlorine, nitro, aminosulphonyl, $C_1$-$C_4$-alkyl, $C_1$-$C_4$-alkoxy, amino, sulpho, hydroxyl or phenylazo or naphthylazo which are optionally substituted in the phenyl nucleus or naphthyl nucleus by hydroxyl, sulpho or amino, and $R_{18}$ denotes hydrogen, chlorine, nitro, $C_1$-$C_4$-alkyl or $C_1$-$C_4$-alkoxy, or represents one of the radicals

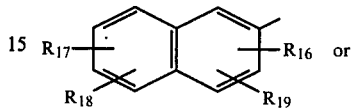 or

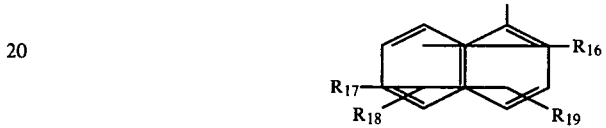

wherein $R_{16}$, $R_{17}$ and $R_{18}$ have the abovementioned meanings and $R_{19}$ = hydrogen, chlorine, nitro, aminosulphonyl, $C_1$-$C_4$-alkyl, $C_1$-$C_4$-alkoxy, amino, sulpho, hydroxyl or phenylazo or naphthylazo which are optionally substituted in the phenyl nucleus or naphthyl nucleus by hydroxyl, sulpho or amino.

11. Anthraquinone dyestuffs of the formula

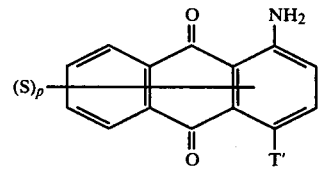

wherein

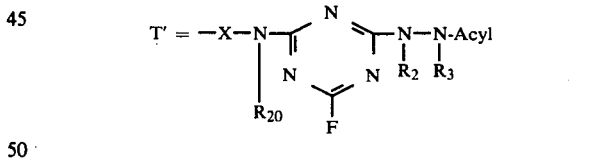

and

X = a direct bond or a bridge member, in particular —NH-arylene-$(CH_2)_{0-1}$

or

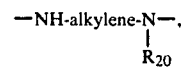

S = hydrogen or a substituent, $R_{20}$ = hydrogen, alkyl or aralkyl, p = 1-6, arylene = a divalent aromatic radical, in particular optionally substituted phenylene, and alkylene=a divalent aliphatic radical, which is optionally interrupted by hetero-atoms.

12. Azaporphin dyestuffs of the formula

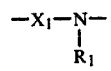

wherein
Pc=the radical of a phthalocyanine, in particular copper phthalocyanine and nickel phthalocyanine, and
m and T have the meaning indicated in claim 1,
wherein
the radical —X—W—Y— represents $$-X_1-\underset{R_1}{N}-$$

and is bonded to the benzene rings of the phthalocyanine nucleus,
wherein
$X_1$ represents —$SO_2$—,

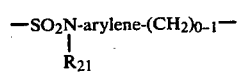

or

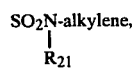

wherein
$R_{21}$=H, $C_1$-$C_4$-alkyl or aralkyl, in particular benzyl,
arylene=a divalent aromatic radical, in particular phenylene, which is optionally substituted, for example by sulpho, $C_1$-$C_4$-alkyl, $C_1$-$C_4$-alkoxy or halogen, and alkylene=a divalent aliphatic radical, which is optionally interrupted by hetero-atoms,
and it also being possible for the phthalocyanine nucleus to contains 1-3 further substituents, in particular sulpho groups and/or sulphonamide groups, and wherein the total number of the substituents—including the reactive substituents—is at most 4.

13. Formazan dyestuffs of the formula

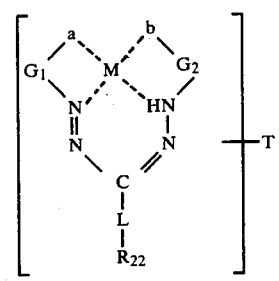

wherein
M=a heavy metal atom, preferably a copper atom,
$G_1$ and $G_2$=aromatic-carbocyclic or aromatic-heterocyclic rings which carry the substituents a and b in the o-position relative to the formazan nitrogen atoms,
a and b=hydrogen, hydroxyl, carboxyl or aminosulphonyl,
L=a direct bond or a bridge member and
$R_{22}$=alkyl or aryl,
it being possible for the aromatic-carbocyclic or aromatic-heterocyclic rings $G_1$ and $G_2$ to contain further substituents, such as $C_1$-$C_4$-alkyl, $C_1$-$C_4$-alkoxy, chlorine, bromine, amino or, preferably, sulpho.

14. Dyestuffs of claim 1, in which X and Y=a direct bond.

15. Dyestuffs of claim 1 containing at least one sulpho group, in particular 1-4 sulpho groups.

16. Dyestuffs of claim 1, in which W=—NH—, $R_1$-$R_3$=H and acyl=—$CONH_2$ or —$COC_6H_5$.

* * * * *